United States Patent
Naito et al.

(10) Patent No.: US 12,535,806 B2
(45) Date of Patent: Jan. 27, 2026

(54) ABNORMALITY DETERMINATION APPARATUS, LEARNING APPARATUS AND ABNORMALITY DETERMINATION METHOD FOR POWER PLANT OR FACTORY

(71) Applicants: KABUSHIKI KAISHA TOSHIBA, Tokyo (JP); Toshiba Energy Systems & Solutions Corporation, Kawasaki (JP)

(72) Inventors: Susumu Naito, Yokohama Kanagawa (JP); Kouta Nakata, Tokyo (JP); Yasunori Taguchi, Kawasaki Kanagawa (JP); Yuichi Kato, Kawasaki Kanagawa (JP); Chikashi Miyamoto, Tokyo (JP); Toshio Aoki, Tokyo (JP); Shinya Tominaga, Kawasaki Kanagawa (JP); Isaku Nagura, Kawasaki Kanagawa (JP); Ryota Miyake, Kawasaki Kanagawa (JP)

(73) Assignees: KABUSHIKI KAISHA TOSHIBA, Kawasaki (JP); Toshiba Energy Systems & Solutions Corporation, Kanagawa (JP)

( * ) Notice: Subject to any disclaimer, the term of this patent is extended or adjusted under 35 U.S.C. 154(b) by 1081 days.

(21) Appl. No.: 17/463,016

(22) Filed: Aug. 31, 2021

(65) Prior Publication Data

US 2022/0137611 A1 May 5, 2022

(30) Foreign Application Priority Data

Nov. 5, 2020 (JP) .................................. 2020-185306

(51) Int. Cl.
*G05B 23/02* (2006.01)
*G06N 20/00* (2019.01)

(52) U.S. Cl.
CPC ....... *G05B 23/024* (2013.01); *G05B 23/0221* (2013.01); *G05B 23/0243* (2013.01);
(Continued)

(58) Field of Classification Search
CPC .............. G05B 23/024; G05B 23/0221; G05B 23/0243; G05B 23/0251; G05B 23/0254;
(Continued)

(56) References Cited

U.S. PATENT DOCUMENTS 8,306,931 B1  11/2012  Bowman et al.
9,378,183 B2 *  6/2016  Tamaki .............. G05B 23/0224
(Continued)

FOREIGN PATENT DOCUMENTS

JP  2018112852 A  7/2018
JP  2019040431 A  3/2019
(Continued)

OTHER PUBLICATIONS

Kim, Seung Geun, Young Ho Chae, and Poong Hyun Seong. "Signal Fault Identification in Nuclear Power Plants Based On Deep Neural Networks." Annals of DAAAM & Proceedings. DAAAM International Vienna, 2019. 846-. Web. (Year: 2019).*
(Continued)

*Primary Examiner* — Huy Q Phan
*Assistant Examiner* — Martin Walter Braunlich
(74) *Attorney, Agent, or Firm* — Holtz, Holtz & Volek PC

(57) ABSTRACT

According to one embodiment, a processing circuit classifies a time-series data corresponding to process amounts generated in a target facility into groups. For each of groups, the processing circuit applies time-series data included in the group to a first auto-encoder, which differs depending upon each group, and outputs time-series data. The processing circuit applies input difference data, which are based on output time-series data on the process amounts and the input
(Continued)

time-series data, to a single second auto-encoder, and outputs difference data. The processing circuit determines an abnormality of the target facility, based on the comparison between addition data which are based on the output difference data and the output time-series data, and the input time-series data.

17 Claims, 24 Drawing Sheets

(52) U.S. Cl.
CPC ..... *G05B 23/0251* (2013.01); *G05B 23/0254* (2013.01); *G06N 20/00* (2019.01)

(58) Field of Classification Search
CPC .... G05B 13/04; G05B 19/4184; G05B 21/02; G05B 23/0224; G05B 23/0259; G05B 23/0281; G06F 11/2257; G06F 17/00
See application file for complete search history.

(56) References Cited

U.S. PATENT DOCUMENTS

| | | | |
|---|---|---|---|
| 10,706,856 | B1 | 7/2020 | Korjani |
| 11,204,602 | B2* | 12/2021 | Cheng ................. G06F 18/2413 |
| 11,531,688 | B2* | 12/2022 | Nakamura ........... G05B 23/024 |
| 11,954,131 | B2* | 4/2024 | Togawa ................. G05B 23/02 |
| 2013/0132000 | A1 | 5/2013 | Tamaki |
| 2020/0057939 | A1 | 2/2020 | Ohashi et al. |
| 2021/0065023 | A1 | 3/2021 | Naito et al. |
| 2021/0110262 | A1* | 4/2021 | Schmitt ................ G06N 3/0985 |
| 2021/0166121 | A1* | 6/2021 | Tsutsui .................... G06N 3/04 |
| 2021/0397938 | A1* | 12/2021 | Tora ...................... G06F 16/904 |
| 2024/0028019 | A1* | 1/2024 | Thiruvenkatanathan .................... G05B 23/0221 |

FOREIGN PATENT DOCUMENTS

| | | |
|---|---|---|
| JP | 2019091236 A | 6/2019 |
| JP | 2019153993 A | 9/2019 |
| JP | 2020035407 A | 3/2020 |
| JP | 2021033705 A | 3/2021 |
| KR | 20130045289 A | 5/2013 |
| KR | 20190081594 A | 7/2019 |

OTHER PUBLICATIONS

Shaheryar, Ahmad, Yin, Xu-Cheng, Hao, Hong-Wei, Ali, Hazrat, Iqbal, Khalid, A Denoising Based Autoassociative Model for Robust Sensor Monitoring in Nuclear Power Plants, Science and Technology of Nuclear Installations, 2016, 9746948, 17 pages, 2016. https://doi.org/10.1155/2016/9746948 (Year: 2016).*

Lu, Kuan et al. "Auto-Encoder Based Fault Early Warning Model for Primary Fan of Power Plant." IOP conference series. Earth and environmental science 358.4 (Year: 2019).*

Anandakumar, H., R. Arulmurugan, and Chow Chee. Onn, eds. Computational Intelligence and Sustainable Systems: Intelligence and Sustainable Computing. 1st ed. 2019. Cham: Springer International Publishing, (Year: 2019).*

Decision to Grant a Patent (and English language translation thereof) dated May 14, 2024, issued in Japanese Application No. 2020-185306.

* cited by examiner

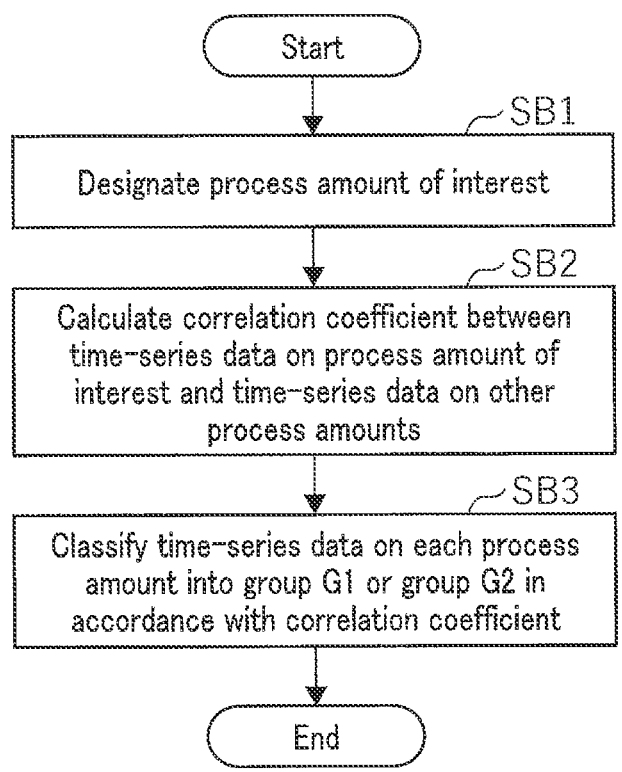
F I G. 4

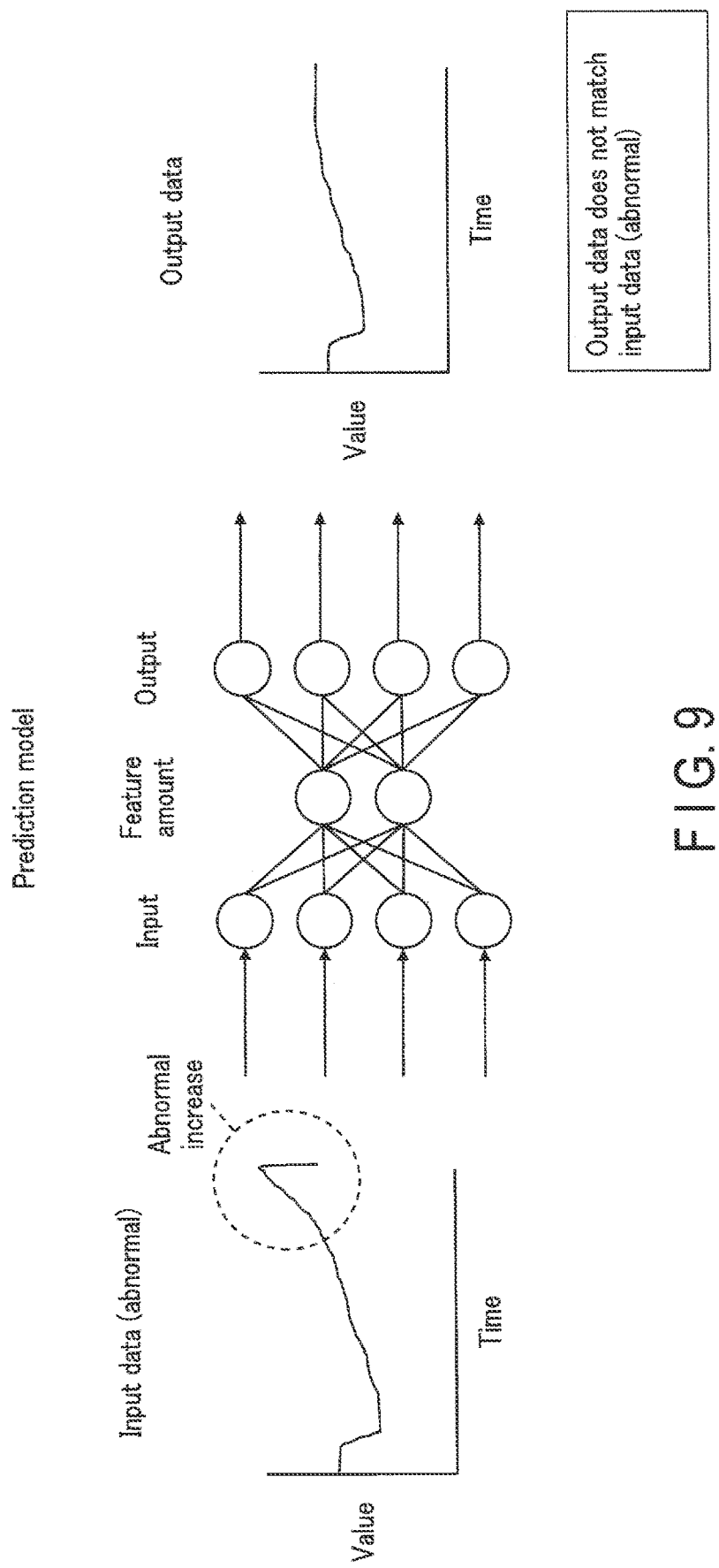
F I G. 9

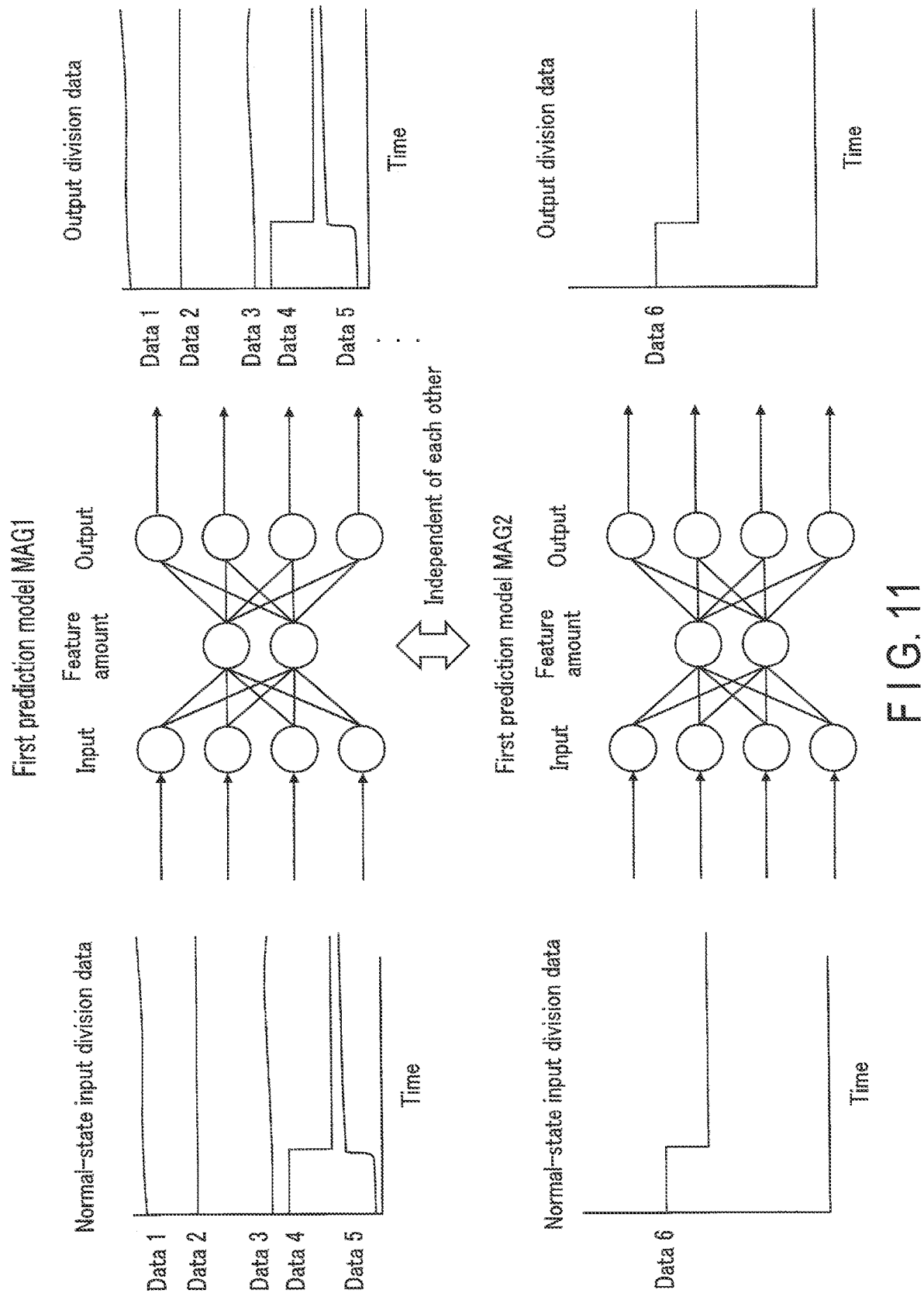
F I G. 11

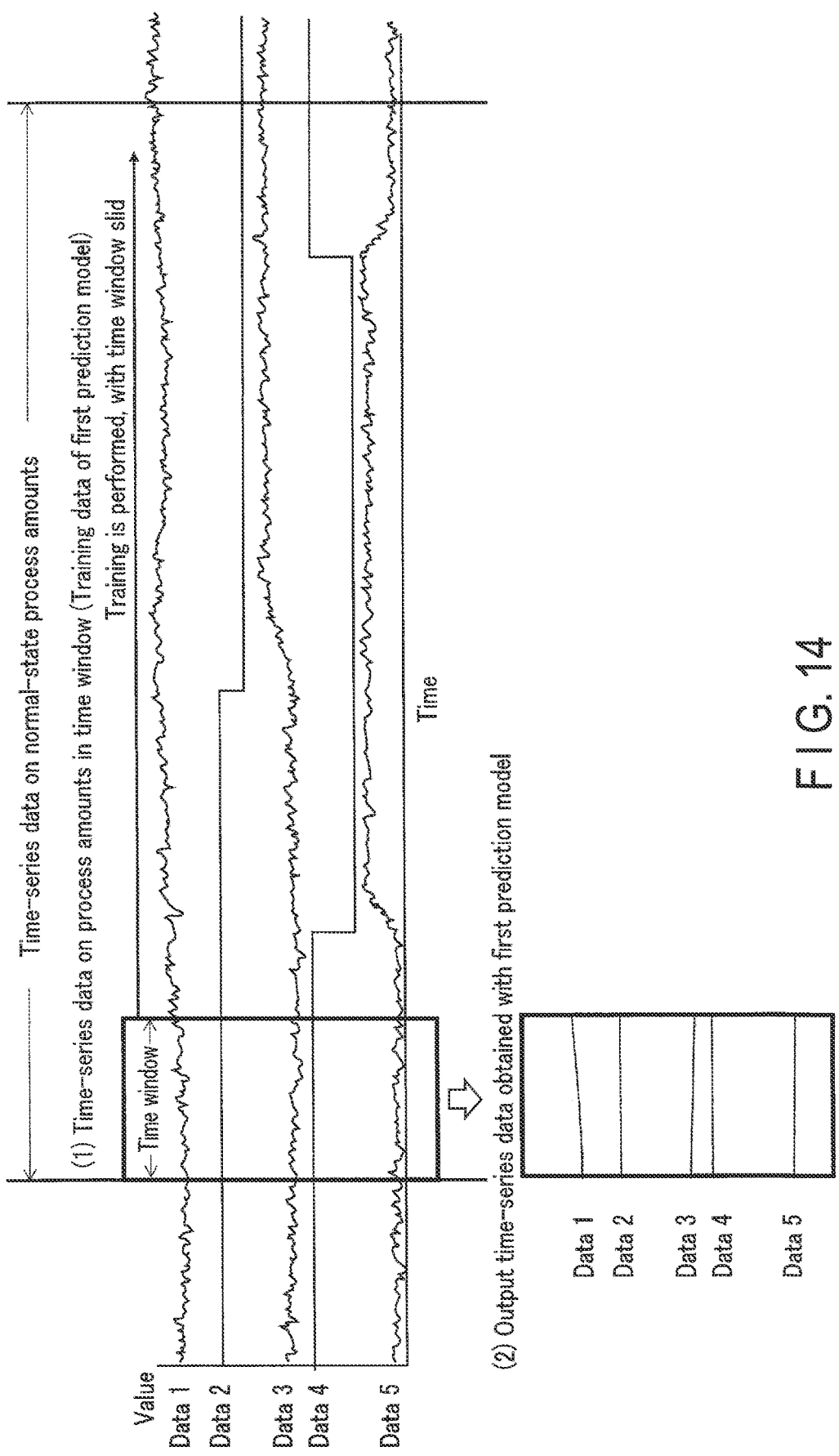
F I G. 14

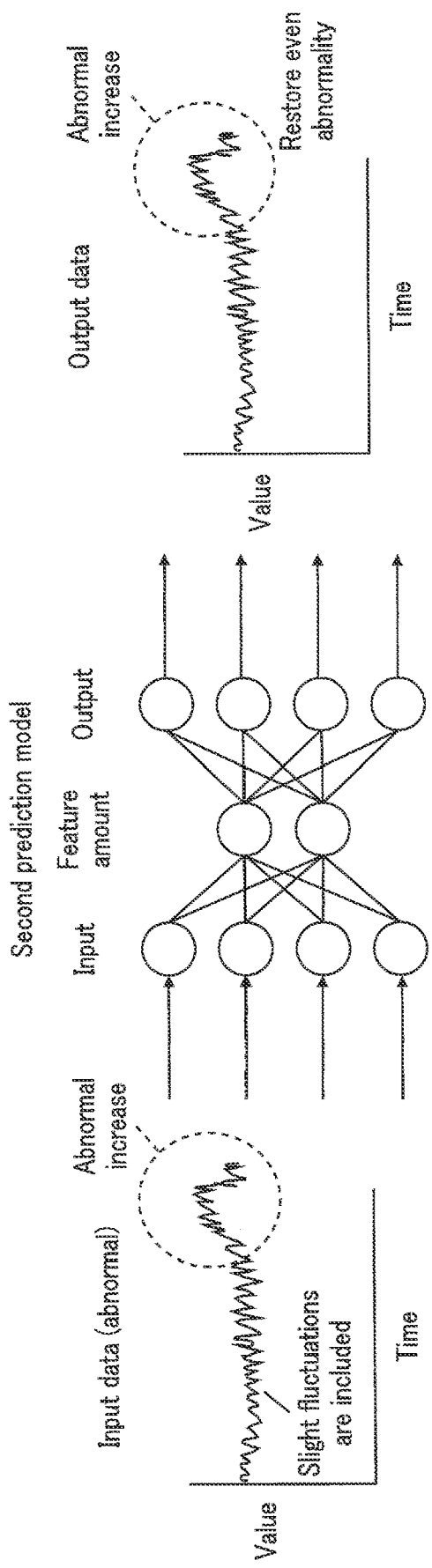
F I G. 16

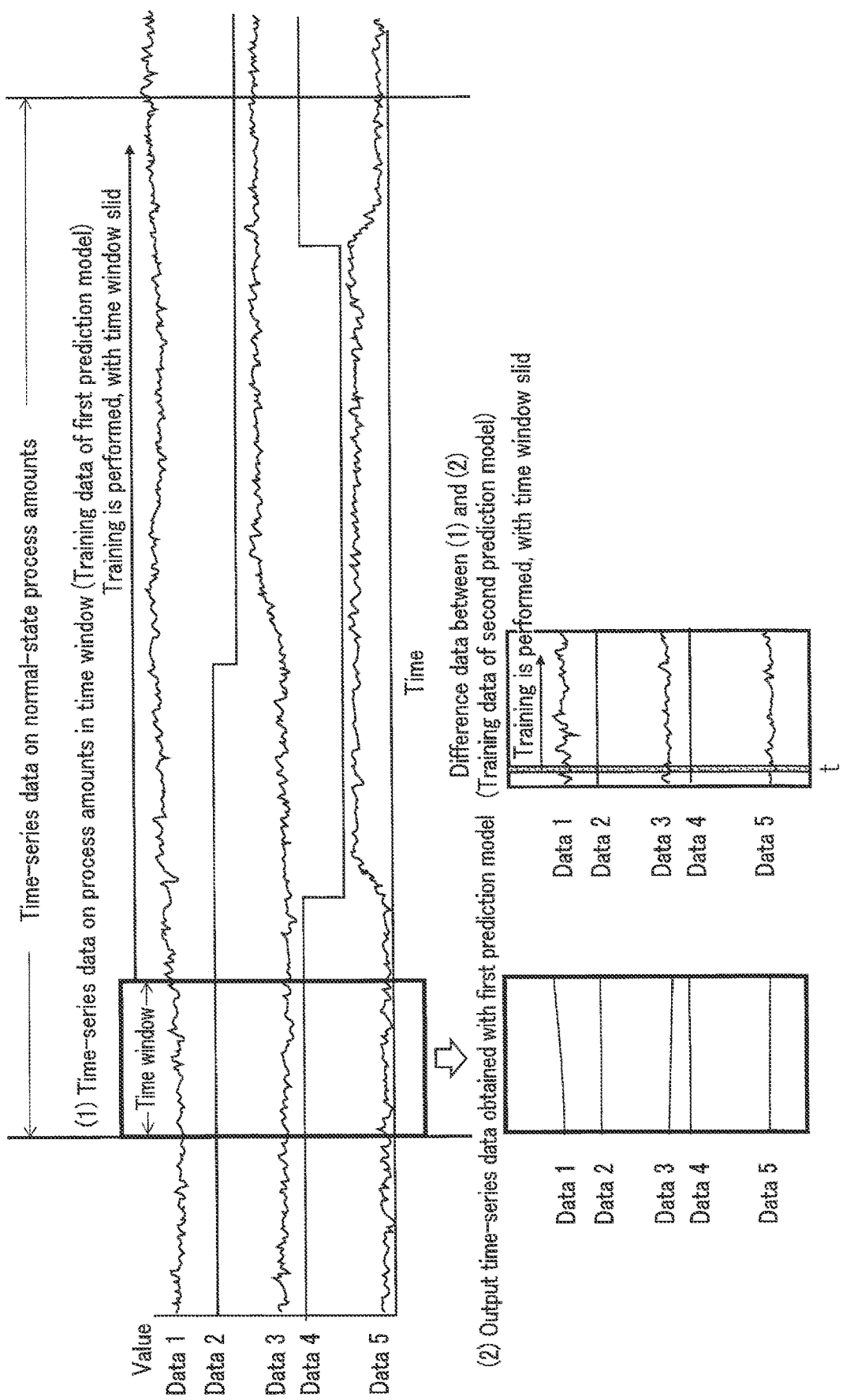
F I G. 19

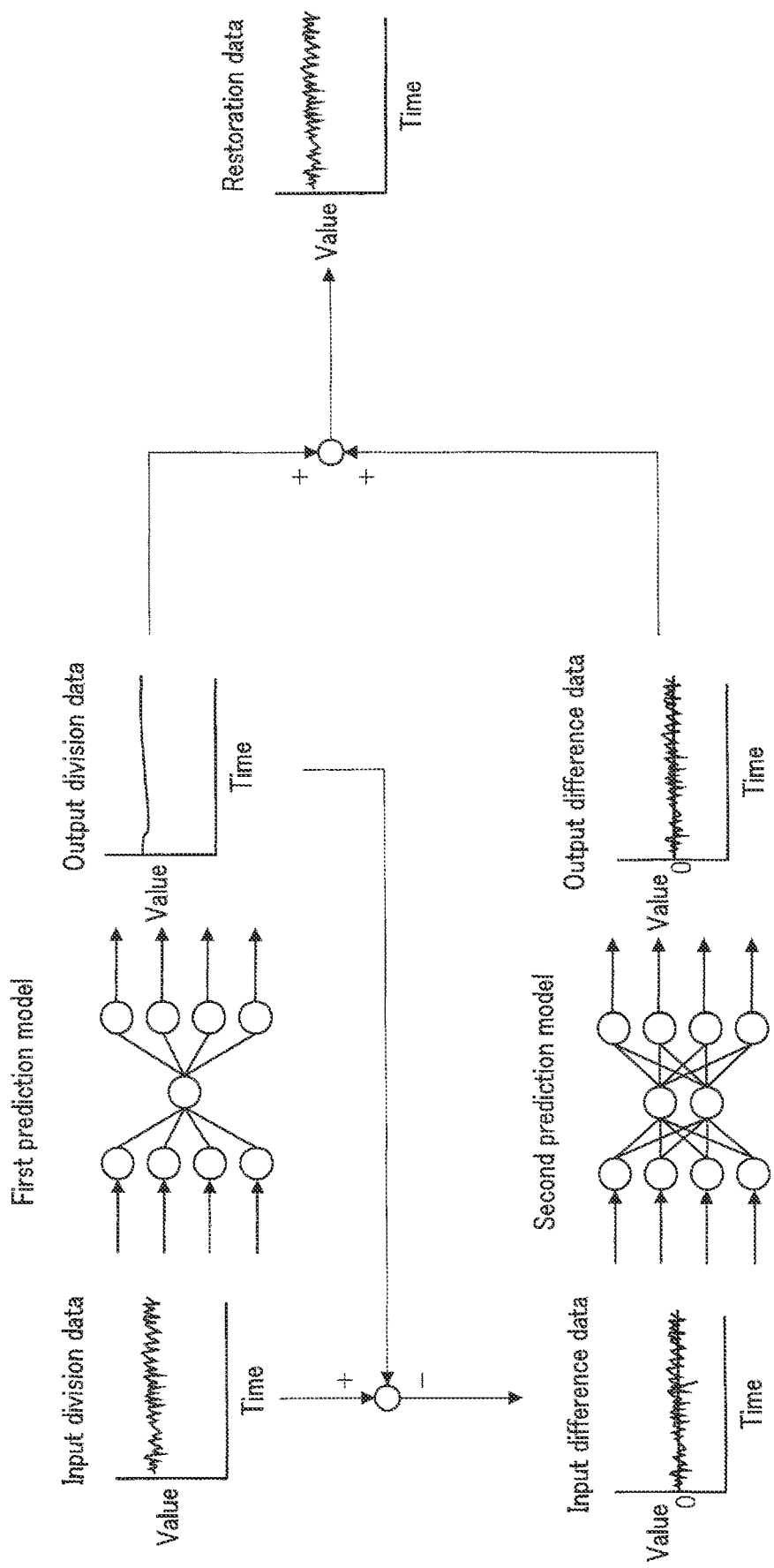
F I G. 20

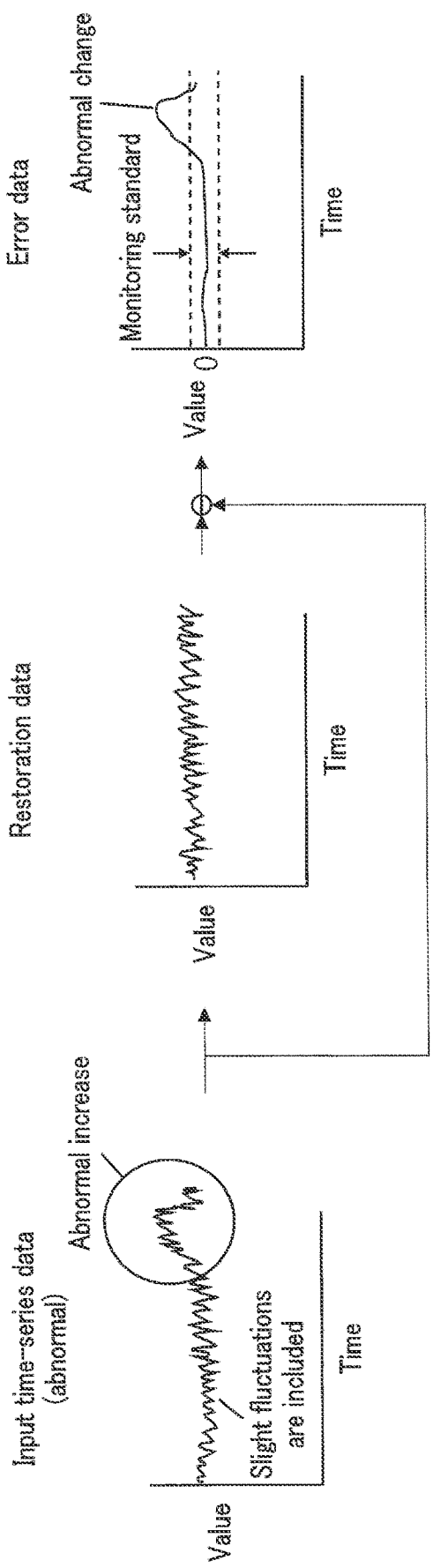
F I G. 25

ABNORMALITY DETERMINATION APPARATUS, LEARNING APPARATUS AND ABNORMALITY DETERMINATION METHOD FOR POWER PLANT OR FACTORY

CROSS-REFERENCE TO RELATED APPLICATIONS

This application is based upon and claims the benefit of priority from Japanese Patent Application No. 2020-185306, filed Nov. 5, 2020, the entire contents of which are incorporated herein by reference.

FIELD

Embodiments described herein relate generally to an abnormality determination apparatus, a learning apparatus and an abnormality determination method.

BACKGROUND

In a large-scale power plant such as a nuclear power plant and a thermal power plant, a large number of process amounts are measured for the purpose of monitoring the performance of the plant and the soundness of various systems and devices that make up the plant. Since it is difficult for a plant operator to constantly monitor all of a large number of process amounts, many plants are equipped with a monitoring system that captures time-series data on the process amounts and detects an abnormal change in the plant.

In the detection of an abnormal change, machine learning is used to detect a sign of abnormality, before the abnormality becomes apparent. For example, a technology has been proposed that uses a regression model of a sensor value obtained from one sensor's time-series data under normal conditions and a sensor correlation model between sensors that takes as input the prediction errors of the regression models, and predicts faults from the output values of the correlation model.

BRIEF DESCRIPTION OF THE DRAWINGS

FIG. 4 is a flowchart showing a classification process performed by a classification unit.

FIG. 9 is a diagram showing the outputs obtained by inputting input data (time-series data) at an abnormal-state into a prediction model.

FIG. 11 is a diagram showing inputs and outputs of a first prediction model of the group G1 and a first prediction model of the group G2.

FIG. 14 is a diagram showing an example of training data of a first prediction model.

FIG. 16 is a diagram showing the output data obtained by inputting input difference data at an abnormal-state into the second prediction model.

FIG. 19 is a diagram showing an example of training data of a second prediction model.

FIG. 20 is a diagram schematically showing a processing process from the input of input division data to the first prediction model to the generation of restoration data.

FIG. 25 is a diagram schematically showing a determination process (the presence of an abnormality or a sign of abnormality) performed by the determination unit.

DETAILED DESCRIPTION

Figure 1:
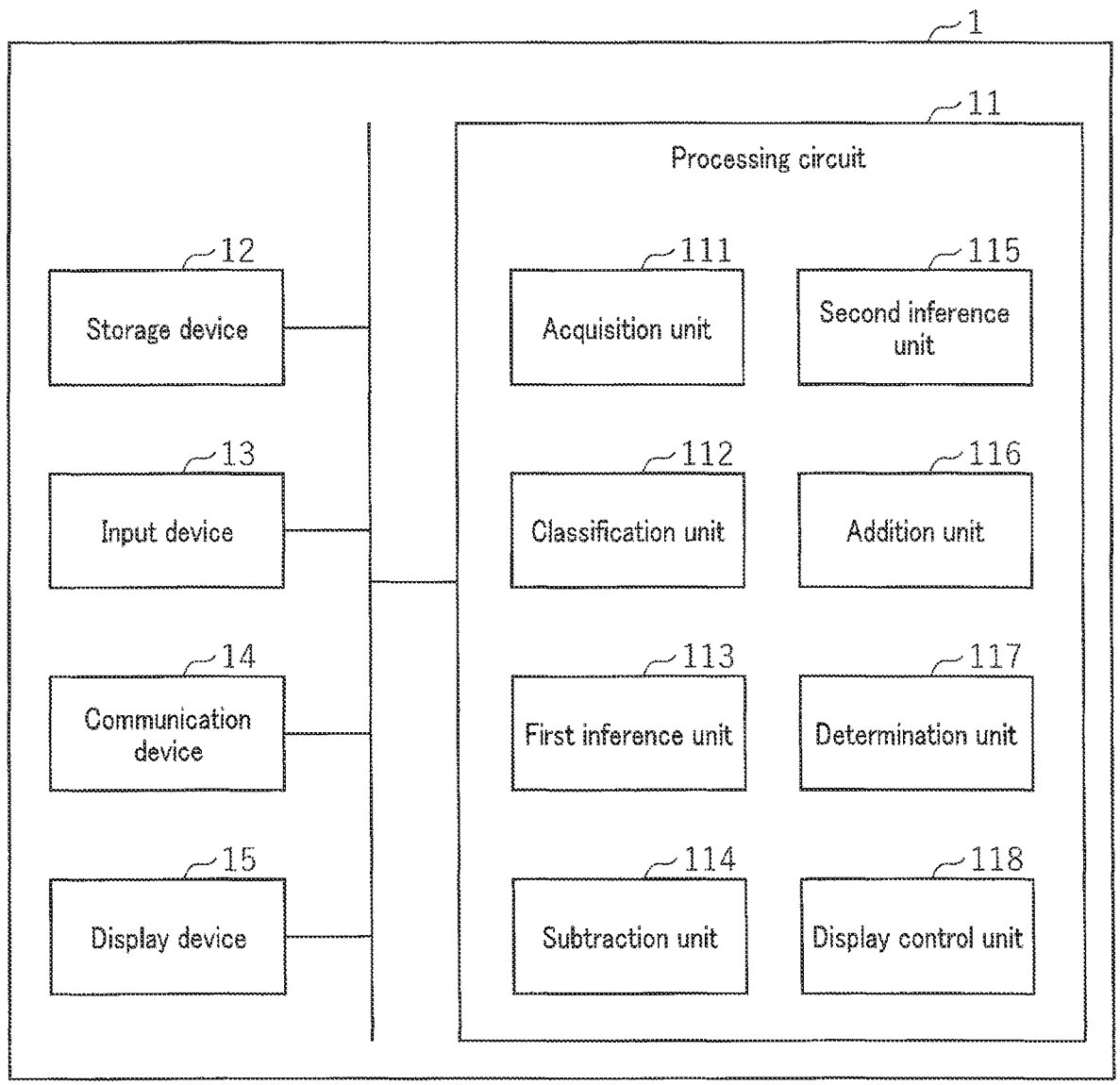
FIG. 1 is a diagram showing a configuration example of an abnormality determination apparatus according to the present embodiment.

In general, according to one embodiment, the abnormality determination apparatus includes a classification unit, a first inference unit, a second inference unit and a determination unit. The classification unit classifies a plurality of input time-series data corresponding to a plurality of process amounts generated in a target facility into a plurality of groups. For each of the plurality of groups, the first inference unit applies one or more input time-series data included in the group to a first dimension reduction/restoration model, which differs depending upon each group, and outputs one or more time-series data. The second inference unit applies a plurality of input difference data, which are based on a plurality of output time-series data on the plurality of process amounts and the plurality of input time-series data, to a single second dimension reduction/restoration model, and outputs a plurality of output difference data. The determination unit determines an abnormality or a sign of abnormality of the target facility, based on the comparison between a plurality of addition data which are based on the plurality of output difference data and the plurality of output time-series data, and the plurality of input time-series data.

In the description set forth below, the abnormality determination apparatus, the learning apparatus and the abnormality determination method according to the present embodiment will be described with reference to the accompanying drawings.

The abnormality determination apparatus according to the present embodiment is a computer or a computer network system that uses data obtained from a target facility as input data and determines an abnormality or a sign of abnormality of the target facility. The target facility is assumed to be a large-scale power plant, such as a nuclear power plant or a thermal power plant, but these do not limit the scope of application of the present embodiment. The present embodiment may be applied to a medium-scale or small-scale power plant and also to any factory equipment or production equipment other than the power plants. In the embodiments set forth below, it is assumed that the target facility is a large-scale power plant. The data obtained from the large-scale power plant will be referred to as plant data. The large-scale power plant may be referred to simply as a plant.

In the abnormality sign detection technology, a sign is detected by sensing a slight change in the plant data. Thus, it is necessary to determine a normal state of the plant with high accuracy. An erroneous determination causes an erroneous detection and causes an operator's unnecessary work. In order to detect a slight change that may be regarded as a fluctuation of data and is therefore difficult to detect visually, the data has to be determined with high accuracy, including a slight fluctuation of the data on the normal state.

However, there are the following three problems in the known art. (1) In general, a high-precision prediction value in which the correlation between sensors is considered cannot be obtained from an output value of a correlation model of a plurality of sensors that receive a prediction error as an input. (2) A plant is a complicated system composed of various systems and equipment, and even in a normal state, the internal state of the plant changes in a complicated manner. For example, the operating conditions of each system and each device often change stepwise. As a result, plant data such as sensor data values (sensor values) of the corresponding sensors change rapidly. Where the regression model is used, a prediction value (time t) is calculated from past data (time t−1, t−2, . . . ). Therefore, a sudden change without a sign cannot be easily determined before time (t−1). (3) With respect to slight fluctuations in sensor values, a single machine learning model often performs erroneous learning and exhibits an identity mapping response to the slight fluctuations. Although the slight fluctuations can be predicted, slight abnormal changes are also predicted as normal states, and abnormalities cannot be detected.

Therefore, the abnormality determination apparatus of the embodiment described below uses a first prediction model and a second prediction model, which are two-stage machine learning models, and performs highly-accurate prediction, based on feature amounts of the plant data on a normal state, including stepwise changes in the operating conditions and slight fluctuations in data. More specifically, feature amounts of main components of the time-series data on a normal process amount are trained by a first model, and feature amounts of the slight fluctuations in the time-series data on the normal process amount are trained by a second model. By using the output values of the two models as prediction values of the process amount, the prediction accuracy is improved and an abnormality or a sign of abnormality of the plant is determined.

FIG. 1 is a diagram showing a configuration example of the abnormality determination apparatus 1 according to the present embodiment. The abnormality determination apparatus 1 is a computer that determines an abnormality or a sign of abnormality of a plant, using a first model and a second model. As shown in FIG. 1, the abnormality determination apparatus 1 includes a processing circuit 11, a storage device 12, an input device 13, a communication device 14 and a display device 15.

The processing circuit 11 includes a processor such as a CPU (Central Processing Unit) and a memory such as a RAM (Random Access Memory). The processing circuit 11 determines an abnormality or a sign of abnormality of a power plant, using the first model and the second model. By executing the program stored in the storage device 12, the processing circuit 11 realizes an acquisition unit 111, a classification unit 112, a first inference unit 113, a subtraction unit 114, a second inference unit 115, an addition unit 116, a determination unit 117 and a display control unit 118. The hardware configuration of the processing circuit 11 is not limited to the above-mentioned example. For example, the hardware configuration may be an application specific integrated circuit (ASIC) that realizes the acquisition unit 111, the classification unit 112, the first inference unit 113, the subtraction unit 114, the second inference unit 115, the addition unit 116, the determination unit 117 and the display control unit 118. The acquisition unit 111, the classification unit 112, the first inference unit 113, the subtraction unit 114, the second inference unit 115, the addition unit 116, the determination unit 117 and/or the display control unit 118 may be implemented as a single integrated circuit or may be implemented as a plurality of integrated circuits, respectively.

The acquisition unit 111 acquires various data used in various processes executed by the abnormality determination apparatus 1. For example, the acquisition unit 111 acquires plant data output from the plant as input data. The acquisition unit 111 records various data, such as acquired plant data, in the storage device 12.

The plant data includes a plurality of time-series data on a plurality of process amounts. Specifically, the process amounts are measurement values output from various sensors used in the plant, and setting values and output values of plant systems and various devices, and the time-series data are series data on these values. For example, in a large-scale power plant such as a nuclear power plant or a thermal power plant, the number of types of process amounts per plant varies from several thousands to several tens of thousands. The acquisition unit 111 acquires all or part of the time-series data relating to the large number of process amounts and uses them as plant data for determining an abnormality or a sign of abnormality. For example, all time-series data may be classified into data according to a plurality of systems, and an abnormality determination may be performed for each system, based on the time-series data. Where the time-series data are classified in this manner, the number of process amounts is, for example, several hundreds to several thousands.

The classification unit 112 classifies a plurality of input time-series data corresponding to a plurality of process amounts generated in the plant into a plurality of groups. In other words, the classification unit 112 divides the plant data relating to the plurality of process amounts into a plurality of input division data respectively corresponding to the plurality of groups.

For each of the plurality of groups, the first inference unit 113 applies one or more time-series data included in the group to a first-dimension reduction/restoration model, which differs depending upon each group, and outputs one or more time-series data. The time-series data applied to the first-dimension reduction/restoration model will be referred to as input time-series data, and the time-series data output from the first-dimensional reduction/restoration model will be referred to as output time-series data. The output time-series data are time-series data from which slight fluctuations included in the input time-series data are excluded and in which the main components included in the input time-series data are restored. The first-dimension reduction/restoration model is trained by a learning apparatus 2 described later. Each first-dimension reduction/restoration model is trained based on normal-state input time-series data on the corresponding process amount, and parameters are trained such that the input time-series data are input and the output time-series data are output. The first-dimension reduction/restoration model has network architecture capable of serially executing dimension reduction and dimension restoration of input time-series data, and is realized, for example, by an autoencoder (encoder/decoder network).

The subtraction unit 114 generates a plurality of difference data that are based on the plurality of output time-series data and the plurality of input time-series data. That is, the subtraction unit 114 generates the difference data between the output time-series data and the input time-series data, for each of the plurality of process amounts. The difference data is data related to slight fluctuations in the input time-series data.

The second inference unit 115 applies a plurality of difference data to a single second-dimension reduction/restoration model, and outputs a plurality of difference data. The difference data applied to the second-dimension reduction/restoration model will be referred to as input difference data, and the difference data output from the second-dimension reduction/restoration model will be referred to as output difference data. The output difference data is data in which the main components of the input difference data are restored. The second-dimension reduction/restoration model is trained by the learning apparatus 2 described later. The second-dimension reduction/restoration model is trained based on a plurality of normal-state difference data on a plurality of process amounts, and is trained such that normal-state difference data are restored. The second-dimension reduction/restoration model has network architecture capable of serially executing dimension reduction and dimension restoration of difference data, and is realized, for example, by an autoencoder (encoder/decoder network).

The addition unit 116 generates a plurality of addition data that are based on the plurality of output difference data and the plurality of input division data. That is, the addition unit 116 generates addition data in which output difference data and input division data corresponding to the process amount of the output difference data are added, for each of a plurality of output difference data. The addition data is data in which the main components and slight fluctuations of the input time-series data are restored. The addition data will be hereinafter referred to as restoration data.

The determination unit 117 determines an abnormality or a sign of abnormality of the plant (target facility), based on the comparison between the plurality of restoration data and the plurality of input time-series data. More specifically, the determination unit 117 compares the restoration data with the input time-series data, applies the comparison result to a monitoring standard created by the learning apparatus 2 described later, and determines if the input division data contains an abnormality. If the input time-series data contains an abnormality, this means that the plant has an abnormality or a sign of abnormality.

The display control unit 118 causes the display device 15 to display various information. For example, the display control unit 118 causes the display device 15 to display a determination result of the determination unit 117, which represents the presence/absence of an abnormality or a signal of abnormality.

The storage device 12 includes a ROM (Read Only Memory), an HDD (Hard Disk Drive), an SSD (Solid State Drive), an integrated circuit storage device, or the like. The storage device 12 stores various calculation results obtained by the processing circuit 11 and various programs executed by the processing circuit 11. Further, the storage device 12 stores the plant data, the first-dimension reduction/restoration model, the second-dimension reduction/restoration model, the monitoring standard, etc.

The input device 13 receives various commands entered by the user. As the input device 13, a keyboard, a mouse, various switches, a touch pad, a touch panel display, etc. can be used. An output signal of the input device 13 is supplied to the processing circuit 11. The input device 13 may be a computer connected to the processing circuit 11 in a wired or wireless manner.

The communication device 14 is an interface for performing information communications with an external device that is connected to the abnormality determination apparatus 1 via a network.

The display device 15 displays various kinds of information. For example, the display device 15 displays whether a determination result of the determination unit 117 represents an abnormality or a signal of abnormality under the control of the display control unit 118. As the display device 15, a CRT (Cathode-Ray Tube) display, a liquid crystal display, an organic EL (Electro Luminescence) display, an LED (Light-Emitting Diode) display, a plasma display, or any other type of display known in the art can be used as appropriate.

The acquisition unit 111, the classification unit 112, the first inference unit 113, the subtraction unit 114, the second inference unit 115, the addition unit 116, the determination unit 117 and/or the display control unit 118 may be implemented on other computers. In this case, the acquisition unit 111, the classification unit 112, the first inference unit 113, the subtraction unit 114, the second inference unit 115, the addition unit 116, the determination unit 117, and the display control unit 118 are realized by a plurality of computers capable of communicating with each other, and the plurality of computers constitute a computer network system for determining an abnormality or a sign of abnormality of the power plant.

Figure 2:
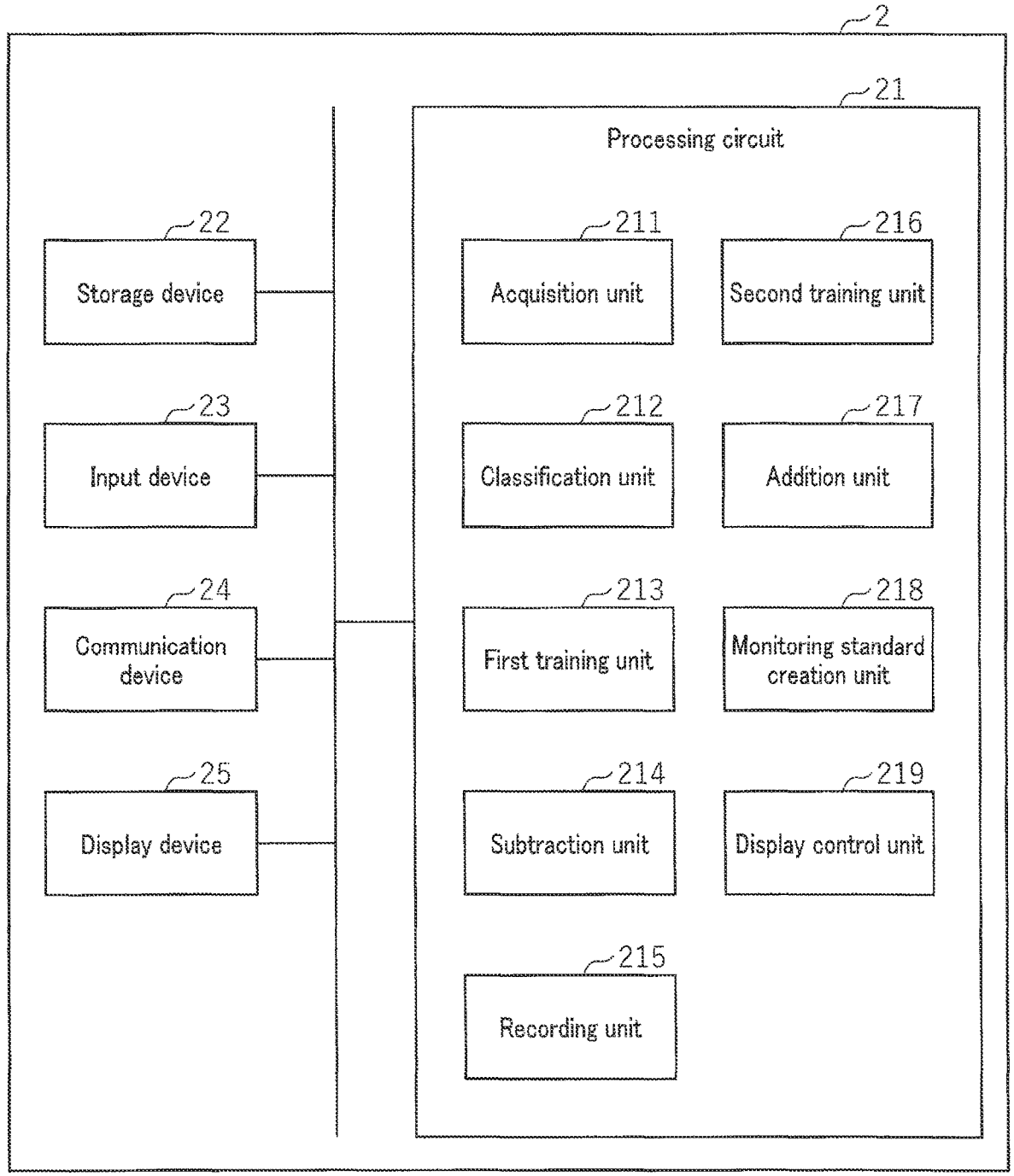
FIG. 2 is a diagram showing a configuration example of a learning apparatus according to the present embodiment.

FIG. 2 is a diagram showing a configuration example of the learning apparatus 2 according to the present embodiment. The learning apparatus 2 is a computer that trains a first model and a second model. As shown in FIG. 2, the learning apparatus 2 includes a processing circuit 21, a storage device 22, an input device 23, a communication device 24 and a display device 25.

The processing circuit 21 includes a processor such as a CPU and a memory such as a RAM. The processing circuit 21 trains the first model and the second model. By executing the program stored in the storage device 22, the processing circuit 21 realizes an acquisition unit 211, a classification unit 212, a first training unit 213, a subtraction unit 214, a recording unit 215, a second training unit 216, an addition unit 217, a monitoring standard creation unit 218 and a display control unit 219. The hardware configuration of the processing circuit 21 is not limited to the above-mentioned example. For example, the processing circuit 21 may be configured, for example, as an ASIC that realizes the acquisition unit 211, the classification unit 212, the first training unit 213, the subtraction unit 214, the recording unit 215, the second training unit 216, the addition unit 217, the monitoring standard creation unit 218 and the display control unit 219. The acquisition unit 211, the classification unit 212, the first training unit 213, the subtraction unit 214, the recording unit 215, the second training unit 216, the addition unit 217, the monitoring standard creation unit 218 and/or the display control unit 219 may be implemented as a single integrated circuit or may be implemented as a plurality of integrated circuits, respectively.

The acquisition unit 211 acquires various data used in various processes executed by the learning apparatus 2. For example, the acquisition unit 211 acquires normal plant data on a plurality of process amounts output from the plant and receives them as input data. The acquisition unit 211 records various data, such as the acquired plant data, in the storage device 22.

The classification unit 212 classifies a plurality of input time-series data corresponding to a plurality of process amounts generated in the plant into a plurality of groups. In other words, the classification unit 212 divides the normal plant data relating to the plurality of process amounts into a plurality of input division data respectively corresponding to the plurality of groups. The processing method of the classification unit 212 is similar to the processing method of the classification unit 112.

The first training unit 213 trains a plurality of first reduction/restoration models corresponding to the plurality of groups, respectively. The first training unit 213 performs learning based on normal input time-series data on the corresponding process amounts, and each of a plurality of first-dimension reduction/restoration models is trained such that input time-series data on the corresponding process amount are input and output time-series data in which the input time-series data are restored are output. As described above, the first dimension reduction/restoration model has network architecture capable of serially executing dimension reduction and dimension restoration of input division data, and is realized, for example, by an autoencoder (encoder/decoder network).

The subtraction unit 214 generates a plurality of difference data that are based on a plurality of normal-state output time-series data and a plurality of normal-state input time-series data. That is, the subtraction unit 214 generates difference data between the output time-series data and the input time-series data, for each of the plurality process amounts. The processing method of the subtraction unit 214 is similar to the processing method of the subtraction unit 114. The difference data generated by the subtraction unit 214 will be hereinafter referred to as input difference data.

The recording unit 215 records an upper limit value and a lower limit value of normal-state input difference data in the storage device 22, for each of the plurality of process amounts. The recording unit 215 may further record a statistic of the normal-state input difference data in the storage device 22, for each of the plurality of process amounts. As the statistic, an interquartile range, a standard deviation, etc. on the entire range of the input difference data can be used.

The second training unit 216 trains a second-dimension reduction/restoration model, based on the normal input difference data, such that the second-dimension reduction/restoration model receives a plurality of input difference data that are based on a plurality of output time-series data and a plurality of input time-series data relating to a plurality of process amounts, and outputs a plurality of output difference data in which the plurality of input difference data are restored. As described above, the second-dimension reduction/restoration model has network architecture capable of serially executing dimension reduction and dimension restoration of input difference data, and is realized, for example, by an autoencoder (encoder/decoder network). The second training unit 216 may train the second-dimension reduction/restoration model, based on input difference data in which the input difference data is limited to an upper limit value and a lower limit value recorded by the recording unit 215.

The addition unit 217 generates a plurality of addition data that are based on the plurality of output difference data and the plurality of output time-series data. That is, the addition unit 217 generates addition data (restoration data) of the output difference data and the output time-series data, for each of the plurality of process amounts. The processing method of the addition unit 217 is similar to the processing method of the addition unit 116.

The monitoring standard creation unit 218 creates a monitoring standard used for a determination process in which the determination unit 117 of the abnormality determination apparatus 1 determines an abnormality or a sign of abnormality. A monitoring standard is created for each process amount. The monitoring standard creation unit 218 creates a monitoring standard, based on normal input time-series data and restoration data regarding the same process amount. The monitoring standard is a threshold value to be compared with the difference between the input time-series data and the restoration data. Where the difference is larger than the threshold value, it is determined that there is an abnormality or a sign of abnormality. The difference between the input time-series data and the restoration data will be hereinafter referred to as an error.

The display control unit 219 causes the display device 25 to display various information.

The storage device 22 includes a ROM, an HDD, an SSD, an integrated circuit storage device, or the like. The storage device 22 stores various calculation results obtained by the processing circuit 21 and various programs executed by the processing circuit 21. Further, the storage device 22 stores plant data, monitoring standards, upper limit values, lower limit values, statistics, etc.

The input device 23 receives various commands entered by the user. As the input device 23, a keyboard, a mouse, various switches, a touch pad, a touch panel display, etc. can be used. An output signal of the input device 23 is supplied to the processing circuit 21. The input device 23 may be a computer connected to the processing circuit 21 in a wired or wireless manner.

The communication device 24 is an interface for performing information communications with an external device that is connected to the learning apparatus 2 via a network.

The display device 25 displays various kinds of information. As the display device 25, a CRT display, a liquid crystal display, an organic EL display, an LED display, a plasma display, or any other type of display known in the art can be used as appropriate.

The acquisition unit 211, the classification unit 212, the first training unit 213, the subtraction unit 214, the recording unit 215, the second training unit 216, the addition unit 217, the monitoring standard creation unit 218 and/or the display control unit 219 may be implemented on other computers. In this case, the acquisition unit 211, the classification unit 212, the first training unit 213, the subtraction unit 214, the recording unit 215, the second training unit 216, the addition unit 217, the monitoring standard creation unit 218 and the display control unit 219 are realized by a plurality of computers capable of communicating with each other, and the plurality of computers jointly constitute a computer network system for training the first model and the second model.

A detailed description will be given of the abnormality determination apparatus 1 and the learning apparatus 2 according to the present embodiment. In the description below, the first-dimension reduction/restoration model will be referred to as a first prediction model, and the second-dimension reduction/restoration model will be referred to as a second prediction model.

Figure 3:
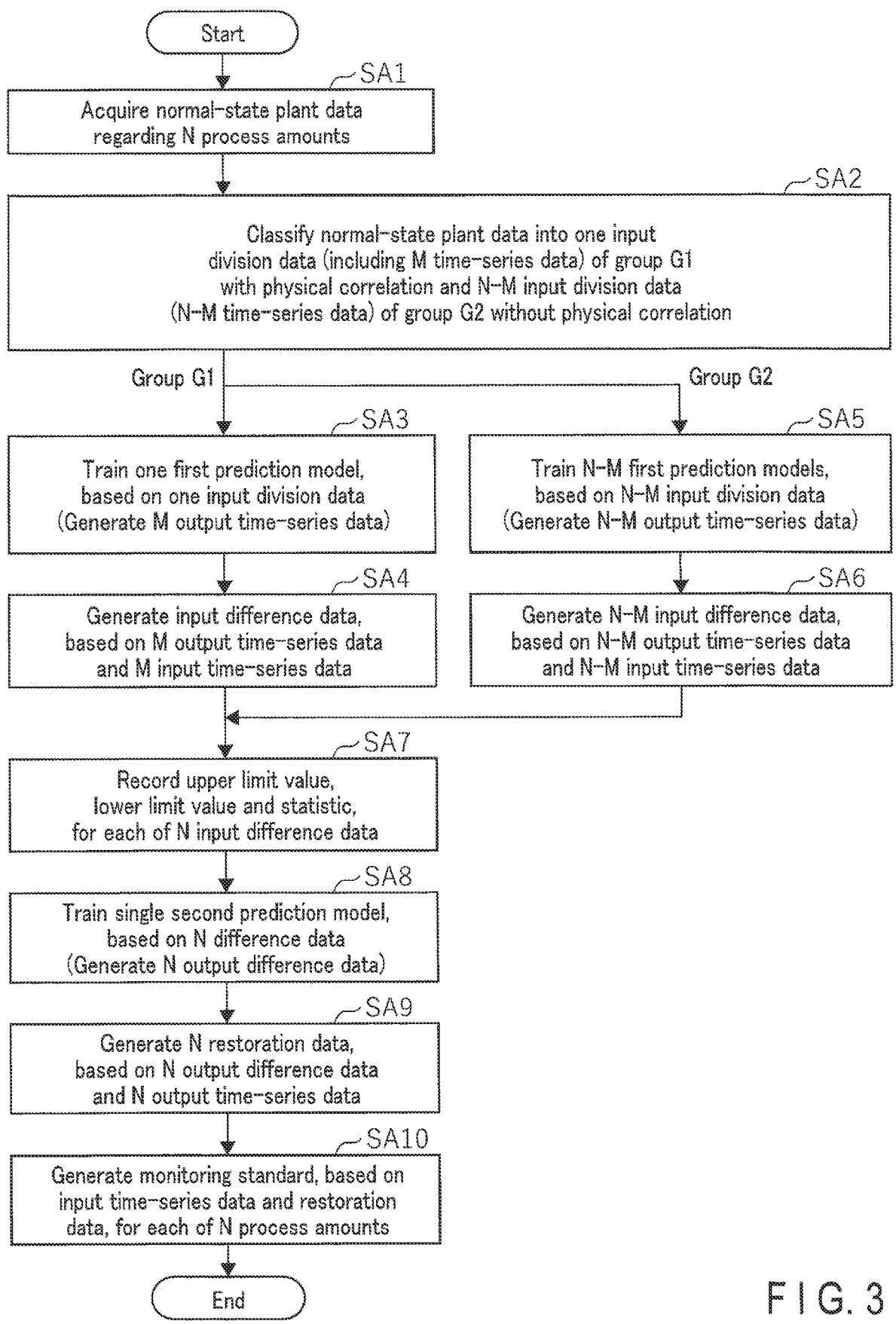
FIG. 3 is a flowchart of a series of processes performed by the learning apparatus.

First, an operation example of the learning apparatus 2 will be described with reference to FIG. 3. FIG. 3 is a flowchart showing a series of processes performed by the learning apparatus 2.

As shown in FIG. 3, the acquisition unit 211 acquires normal-state plant data on N process amounts (step SA1). The plant data includes N input time-series data corresponding to the respective N process amounts.

After step SA1 is performed, the classification unit 212 classifies the normal-state plant data acquired in step SA1 into one input division data of the group G1 with physical correlation and N–M input division data of the group G2 without physical correlation (step SA2). One input division data on the group G1 includes M time-series data. Each of the N–M input division data on the group G2 includes one time-series data. That is, the N–M input division data includes N–M time-series data. The group G2 can also be expressed as having N–M groups corresponding to N–M input division data.

With reference to FIG. 4, a description will be given of the classification process performed by the classification unit 212. FIG. 4 is a flowchart of the classification process performed by the classification unit 212.

As shown in FIG. 4, the classification unit 212 designates a process amount which is of interest (hereinafter referred to as a process amount of interest) from among the N process amounts (step SB1). After step SB1 is performed, the classification unit 212 calculates a correlation coefficient between time-series data on the process amount of interest designated in step SB1 and time-series data on other process amounts (step SB2). Then, the classification unit 212 classifies the time-series data on each process amount into group G1 or group G2 in accordance with the correlation coefficient calculated in step SB2 (step SB3).

Figure 5:
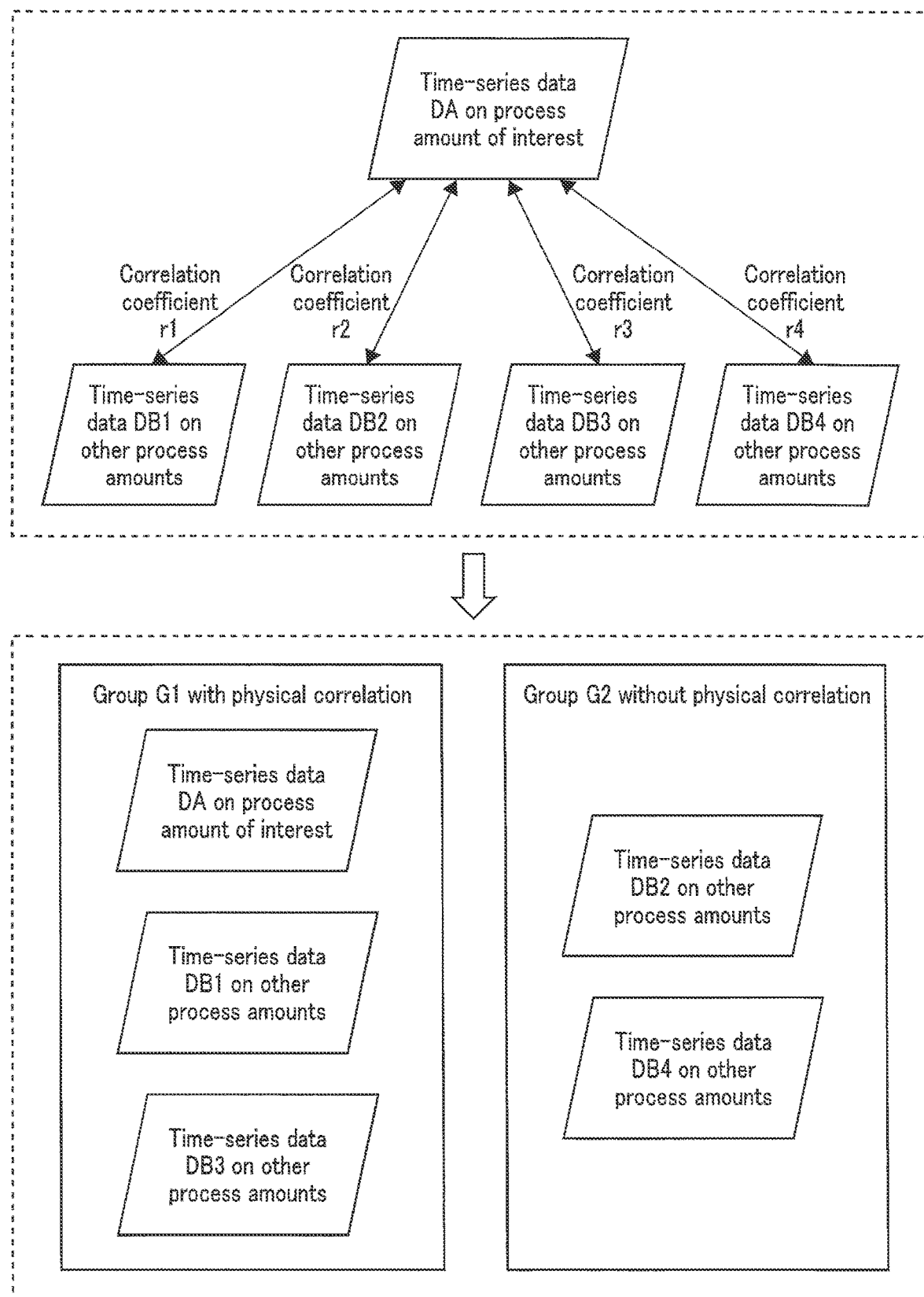
FIG. 5 is a diagram schematically showing the classification process performed by the classification unit.

FIG. 5 is a diagram schematically showing the classification process performed by the classification unit 212.

As shown in FIG. 5, the classification unit 212 classifies the time-series data on a normal-state process amount into the group G1 for learning the time correlation between process amounts and the group G2 for learning only the time correlation of a single process amount. The group G1 includes process amounts having a physical correlation, such as temperatures, pressures, flow rates at the inlet and outlet of the same type of devices (e.g., a feed-water heater, a low-pressure condensate pump, a high-pressure condensate pump and a condenser) or different types of devices that operate in synchronization or in conjunction. The group G2 includes process amounts having no physical correlation, such as a temperature and a vibration of a part of a single device (e.g., a motor bearing), a valve opening of a bypass valve whose open/closed state does not change during one operation period, or devices which do not interlock or operate in synchronization. It should be noted that in a large-scale plant, there are tens of thousands of process amounts, and even if these process amounts are handled in system units, the number of process amounts handled in each system is several hundreds to several thousands. It takes a lot of time and labor to manually divide all these process amounts, based on the design information and operation knowledge of the plant.

Therefore, as an auxiliary work, the classification unit 212 designates a process amount of interest from among a plurality of process amounts on the process data acquired in step SA1. For the process amount of interest, for example, in a nuclear power plant, an inlet pressure and an outlet pressure of a main component of the system (such as a reactor water supply pump) are designated. The classification unit 212 may designate a process amount designated by the user by means of the input device 23 as the process amount of interest, or may designate a predetermined process amount as the process amount of interest.

Next, the classification unit 212 calculates a correlation coefficient between the time-series data on the normal-state process amount of interest and the time-series data on other process amounts. The main component operates in conjunction with a large number of components, and the process amount of interest has a physical correlation with a large number of process amounts. FIG. 5 shows an example in which five time-series data on five process amounts are included. Correlation coefficients r1 to r4 between the time-series data DA on the process amount of interest and the time-series data DB1 to DB4 on other process amounts are calculated.

When the correlation coefficients are calculated, the classification unit 212 selects time-series data on the process amounts whose correlation coefficients are larger than the threshold value, and classifies the selected time-series data into the physically correlated group G1. Where the correlation coefficient r satisfies the relation r<−0.4 or r>0.4, there is a positive or negative correlation between the process amounts. In this case, the thresholds are set to "−0.4" and "+0.4", and time-series data having a correlation coefficient smaller than "−0.4" and time-series data having a correlation coefficient larger than "+0.4" are classified into the group G1. Time-series data having a correlation coefficient of not less than "−0.4" and not more than "+0.4" are classified into the group G2. In the case shown in FIG. 5, the time-series data DA on the process amount of interest, the time-series data DB1 and DB3 on other process amounts are classified into the group G1, and the time-series data DB2 and DB4 on other process amounts are classified into the group G2. Each of the time-series data DB2 and DB4 forms an individual group within the group G2. By classifying the time-series data based on threshold values, grouping can be performed semi-automatically, and the number of work steps can be reduced. The time-series data on the process amount of interest is classified into the group G1.

Figure 6:
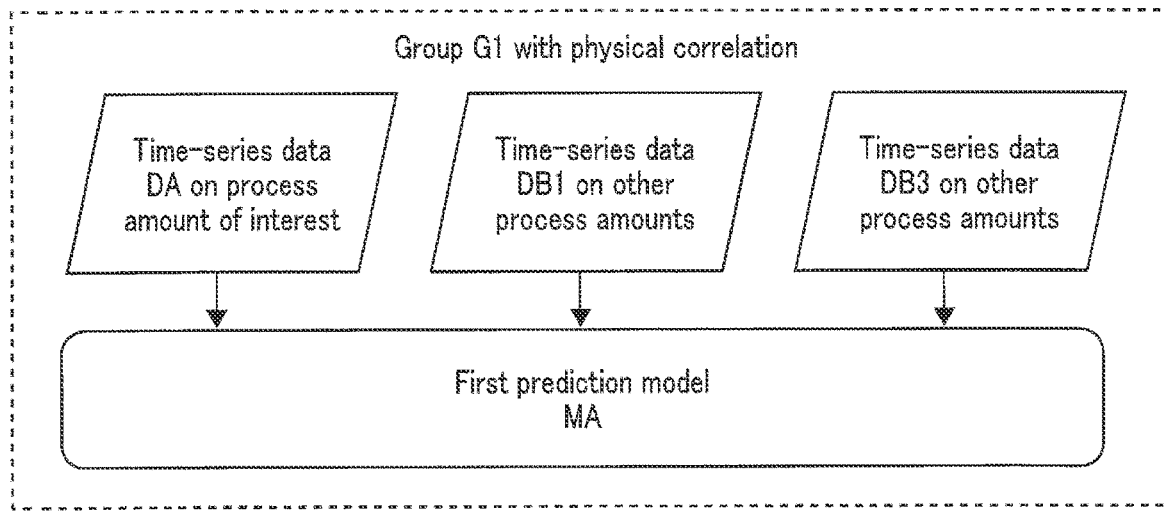
FIG. 6 is a diagram showing the relationship between time-series data belonging to the group G1 of FIG. 5 and the number of first prediction models.
Figure 7:
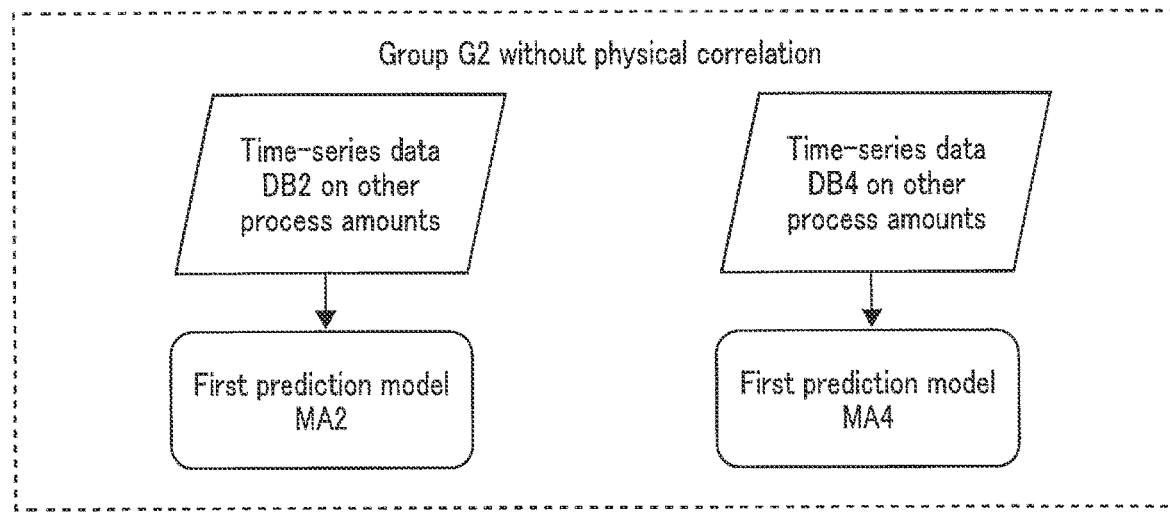
FIG. 7 is a diagram showing the relationship between time-series data belonging to the group G2 of FIG. 5 and the number of first prediction models.

FIG. 6 is a diagram showing how time-series data belonging to the group G1 and the number of first prediction models are related. FIG. 7 is a diagram showing how time-series data belonging to the group G2 and the number of first prediction models are related. As shown in FIG. 6, one first prediction model MA is applied to the time-series data DA, DB1 and DB3 belonging to the group G1. As shown in FIG. 7, the first prediction model MA2 for the time-series data DB2 is applied to the time-series data DB2 belonging to the group G2, and first prediction model MA4 for the time-series data DB4 is applied to the time-series data DB4. In this manner, one first prediction model is applied to the time-series data on a plurality of process amounts belonging to the group G1. With respect to a plurality of process amounts belonging to the group G2, one first prediction model is applied to each time-series data. As described above, since each of the time-series data DB2 and DB4 forms an individual group in the group G2, it can be said that one first prediction model is applied to each group included in the group G2.

The classification unit 212 may create a table (hereinafter referred to as a group recording table), such as a LUT (Look Up Table) that records groups for each process amount. The group recording table associates the types of process amounts with the types of groups. The group recording table is stored in the storage device 12 of the abnormality determination apparatus 1.

The above-mentioned method for grouping input time-series data is an example, and this is not restrictive. For example, the classification unit 212 may classify each process amount into the group G1 or the group G2 according to an instruction the user enters via the input device 23.

As shown in FIG. 3, after step SA2 is performed, the first training unit 213 trains one first prediction model for the group G1, based on one input division data (step SA3). The first prediction model for the group G1 trains parameters such as weights and biases such that one input division data, i.e., M input time-series data, is input and M output time-series data in which M normal-state input time-series data are restored are output. Since the first prediction model of the group G1 is a dimension reduction/restoration model, normal-state time-series data can be restored from the feature amount of the normal-state time-series data by training. In step SA3, the first training unit 213 applies the M input time-series data included in one input division data to the trained first prediction model of the group G1 so as to generate M output time-series data. The trained first prediction model is stored in the storage device 12 of the abnormality determination apparatus 1. The storage device 12 stores the trained first prediction model by assigning it with a flag indicating that it belongs to the group G1 and a flag indicating the type of the corresponding process amount.

After step SA3 is performed, the subtraction unit 214 generates M difference data, based on the M output time-series data and the M input time-series data (step SA4). The difference data on each process amount is data related to slight fluctuations in the input time-series data on the process amount.

Further, after step SA2 is performed, the first training unit 213 trains N−M first prediction models for the group G2, based on N−M input division data (step SA5). Each first prediction model for the group G2 trains parameters such that one input time-series data is input and one output time-series data in which the normal-state input time-series data on the corresponding process amount is restored is output. Since the first prediction model of the group G2 is a dimension reduction/restoration model, like the first prediction model of the group G1, normal-state time-series data can be restored from the feature amount of the normal-state time-series data by training. In step SA5, the first training unit 213 applies one input time-series data to the trained first prediction model of the group G2 so as to generate one output time-series data.

The trained first prediction model of the group G2 is stored in the storage device 12 of the abnormality determination apparatus 1. The storage device 12 stores the trained first prediction model of the group G2 by assigning it with a flag indicating that it belongs to the group G2 and a flag indicating the type of the corresponding process amount.

After step SA5 is performed, the subtraction unit 214 generates N−M difference data, based on N−M output time-series data and N−M input time-series data (step SA6). The difference data on each process amount is data related to slight fluctuations in the input time-series data on the corresponding process amount.

The steps SA3 and SA4 and the steps SA5 and SA6 may be performed in parallel or in series. Further, the steps SA3 and SA5 may be first performed in parallel or in series, and then the steps SA4 and SA6 may be performed in parallel or in series.

As described above, as the prediction model such as the first prediction model or the second prediction model, an autoencoder which is an example of the dimension reduction/restoration model is used. An abnormality detection method using an autoencoder will now be described.

Figure 8:
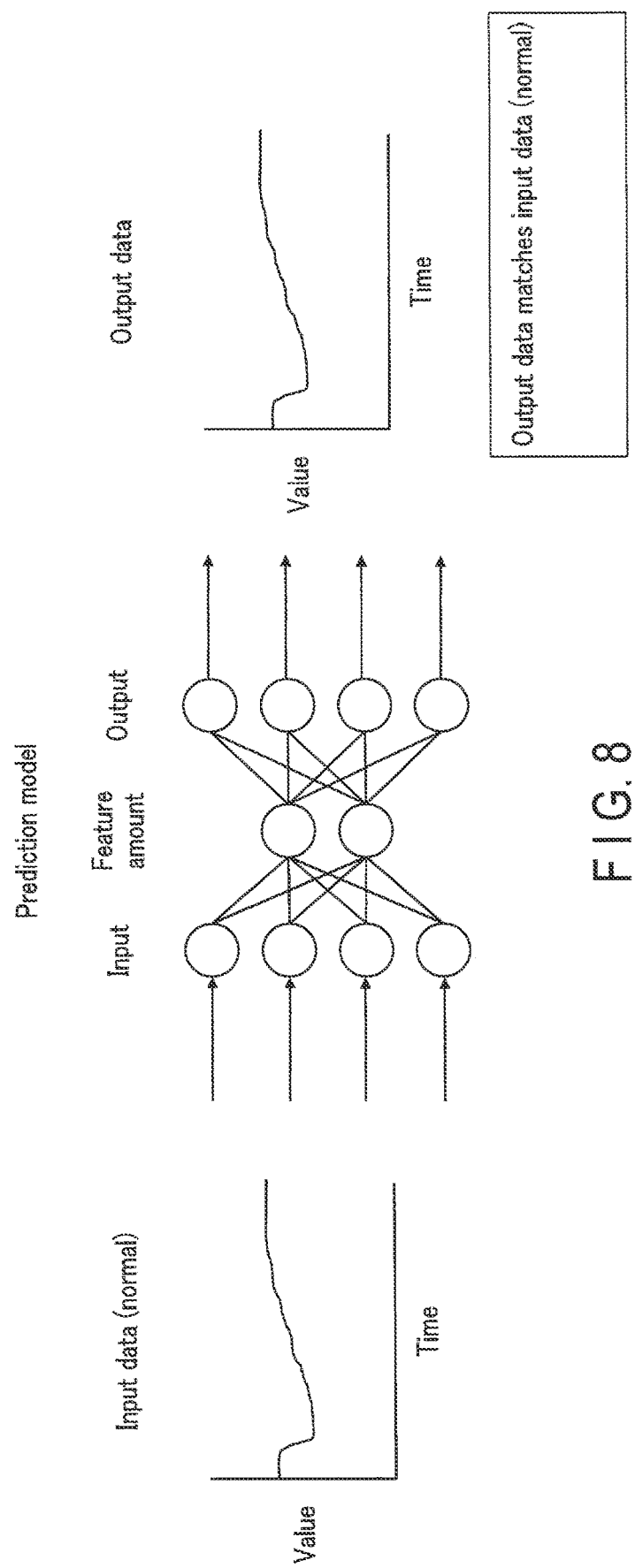
FIG. 8 is a diagram showing the outputs obtained by inputting input data (time-series data) at a normal-state into a prediction model (autoencoder).

FIGS. 8 and 9 are diagrams showing how inputs and outputs of the prediction model (autoencoder) are. FIG. 8 shows an example in which normal input data (time-series data) are input to the prediction model, and FIG. 9 is an example in which abnormal input data (time-series data) are input to the prediction model. In the prediction models shown in FIGS. 8 and 9, it is assumed that the number of input channels and the number of output channels are both "4", but the number of channels is not limited to this. Each of the number of input channels and the number of output channels may be two or more, but typically it is assumed to be about several tens to several tens of thousands. In the description set forth below, the input data is shown as time-series data on one or several process amounts for the sake of convenience. In reality, a power plant, whether it is a nuclear power plant or a thermal power plant, uses several thousands to several tens of thousands of process amount signals, and where these are grouped into system units, the process amount signals input to one prediction model range from several hundreds to several thousands.

As shown in FIGS. 8 and 9, the prediction model is a model in which input data is classified by the feature amount extracted from the training data and the original input data is restored from the feature amount. As shown in FIG. 8, where the normal-state time-series data is trained as training data, the normal-state time-series data is output in response to the input of normal-state time-series data. In this case, the input data and the output data match each other. On the other hand, as shown in FIG. 9, where data that includes features (e.g., an abnormal increase) not included in the normal-state time-series data, that is, abnormal data, is input, the output data and the input data do not match each other. An abnormality is detected from the difference between the input data and the output data. That is, a normality is determined where the output data and the input data match each other, and an abnormality is determined where the output data and the input data do not match each other.

Although FIGS. 8 and 9 show an autoencoder having one intermediate layer, the number of intermediate layers may be two or more. In the case of such a configuration, any one of the plurality of intermediate layers corresponds to the layer representing a feature amount. The number of channels in the intermediate layer, that is, the number of features, does not have to be two, and may be any number as long as it is smaller than the number of channels of the input channels and the number of output channels.

Figure 10:
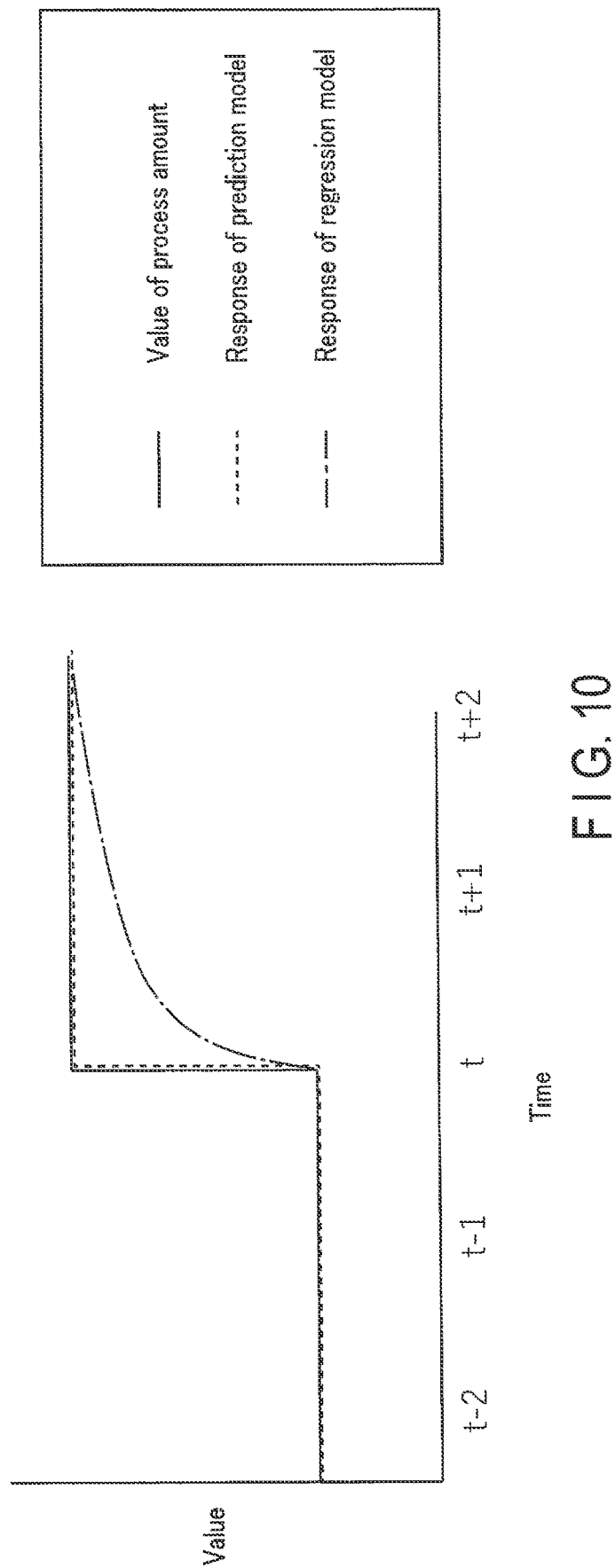
FIG. 10 is a diagram for showing the difference in response between a regression model and a first prediction model.

The advantage of using the autoencoder as a prediction model will be described with reference to FIG. 10. FIG. 10 is a diagram for showing how a response of a regression model and a response of a first prediction model differ from each other. The regression model is a model that calculates a prediction value (time t) from past data (time t−1, t−2, . . . ). In a plant, the operating condition may often change stepwise under a normal condition, and as a result, a sensor value may change suddenly. However, since the past data (t−1, t−2, . . . ) does not include a sign that the sensor value will change suddenly, a stepwise change is hard to predict from the past data.

In the regression model, therefore, it is typical that the response gradually approaches the sensor value with the passage of time, as shown in FIG. 10. On the other hand, in the model MA, the sensor value at time t is used to restore the sensor value at time t. The stepwise change of the sensor value at time t is included in the input to the first prediction model. Therefore, if the stepwise change matches the feature extracted from the training data, the sensor value can be restored in synchronization with the stepwise change. Therefore, in the first prediction model, the response is a response in which a sudden change in a normal sensor value is restored.

As described above, in step SA2, the classification unit 212 classifies the process amounts having no physical correlation into different groups, and the first training unit 213 individually trains the first prediction model of each group.

FIG. 11 is a diagram showing how inputs and outputs of a first prediction model MAG1 of the group G1 are and how inputs and outputs of a first prediction model MAG2 of the group G2 are. The process amounts 1 to 5 are classified into the group G1, and the process amount 6 is classified into the group G2. In this case, the input division data of the group G1 include input time-series data 1 to 5 on the process amounts 1 to 5, and the input division data of the group G2 includes input time-series data 6 on the process amount 6. As shown in FIG. 11, by training the normal-state input division data as the training data, the first prediction models MAG1 and MAG2 can be models that restore normal-state time-series data by using the feature amount of the normal-state time-series data. The input division data have no physical correlation, and if the variation tendencies of the input division data happen to be similar, they are dealt with as a spurious correlation. By training an independent different model for each input division data, training of a spurious correlation can be eliminated in principle. By eliminating the training of the spurious correlation, an erroneous prediction can be prevented.

Figure 12:
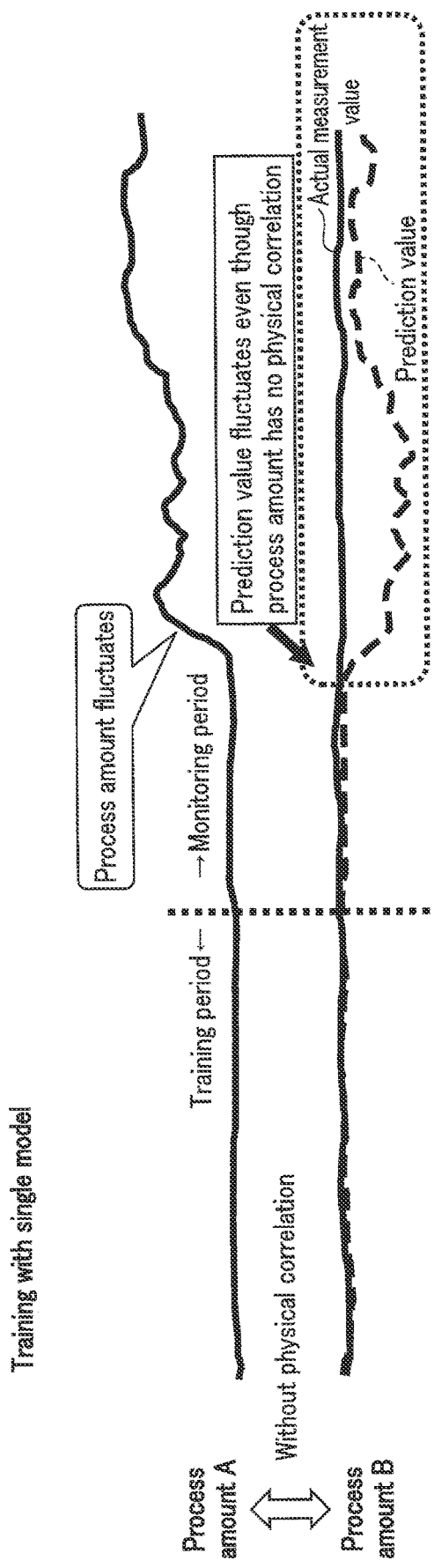
FIG. 12 shows the time series of process amounts A and B where the process amounts A and B having no physical correlation are classified into the same group and a single first prediction model is trained for the process amounts A and B.
Figure 13:
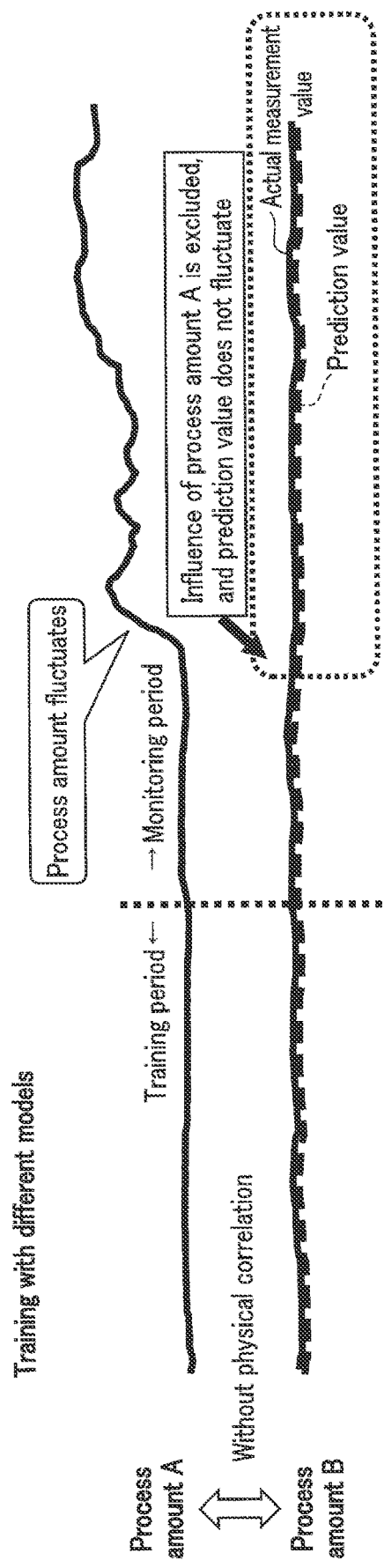
FIG. 13 shows the time series of process amounts A and B where the process amounts A and B having no physical correlation are classified into different groups and different first prediction models are trained for the process amounts A and B.

With reference to FIGS. 12 and 13, a description will be given of the significance of classifying the process amounts having no physical correlation into different groups and individually training the first prediction model of each group. FIGS. 12 and 13 are diagrams showing how process amounts A and B having no physical correlation change in time series. Only an actual measurement value is shown with respect to the process amount A, and both an actual measurement value and a prediction value are shown with respect to the process amount B. The actual measurement value indicates a crest value of the time-series data input to the first prediction model, and the prediction value indicates a crest value of the time-series data output from the first prediction model.

FIG. 12 shows an example in which the process amounts A and B are classified into the same group and a single first prediction model is trained for the process amounts A and B. It is assumed that the actual measurement values of the process amounts A and B present a similar tendency during the training period (i.e., the period in which the learning apparatus 2 trains the first prediction model). In this case, the first prediction model performs training as if the process amounts A and B have a physical correlation even though they do not actually have such a physical correlation. If, during the monitoring period (i.e., the period in which the abnormality determination apparatus 1 determines an abnormality or a sign of abnormality), the process amounts A and B vary in a different manner from that during the training period, and the actual measurement values and the prediction values may deviate from each other. For example, as shown in FIG. 12, if the actual measurement value of the process amount A fluctuates greatly in the monitoring period unlike the actual measurement value in the training period, the prediction value of the process amount B fluctuates significantly even though the actual measurement value of the process amount B does not fluctuate greatly as in the training period. This is a spurious correlation.

FIG. 13 shows an example in which the process amounts A and B are classified into different groups, and separate first prediction models are trained for the process amounts A and B. It is assumed that the actual measurement values of the process amounts A and B have a similar tendency during the training period. Where prediction values of the process amount A and the process amount B are made to output from different first prediction models, the influence of the actual measurement value of the process amount A can be excluded from the prediction value of the process amount B. Therefore, as shown in FIG. 13, even if the actual measurement value of the process amount A fluctuates greatly in the monitoring organization unlike the actual measurement value in the training period, the prediction value of the process amount B does not fluctuate and does not greatly deviate from the actual measurement value. Thus, by classifying the process amounts having no physical correlation into different groups and training the first prediction model of each group individually, it is possible to eliminate a spurious correlation which the process amounts having no physical correlation may cause. Therefore, the first prediction model enables enhancement of the restoration accuracy of the time-series data on the process amounts having no physical correlation.

Next, a description will be given of a learning method in which the first training unit 213 trains the first prediction model. Since the learning method does not differ between the first group and the second group, the first prediction model for the first group and the first prediction model for the second group will not be distinguished and will be referred to simply as the first prediction model.

In a plant operation, a time difference and a time constant are present from the command of an operation to the response of devices or the response of physical amounts such as pressures and flow rates. In training, a time window having a predetermined time length is determined according to the response time mentioned above. The predetermined time length is determined by using frequency analysis such as fast Fourier transform of plant data, plant operation procedures, etc. In a power plant such as a nuclear power plant or a thermal power plant, the predetermined time length is several tens of slights to several hours. In general, in machine learning, the more training data are provided, the better will be the accuracy.

FIG. 14 is a diagram showing an example of training data of the first prediction model. As shown in FIG. 14, the first training unit 213 determines a time window having a predetermined time length at regular intervals along the time axis from the normal-state time-series data, extracts the time-series data in each time window, and uses the extracted time-series data as training data. Thus, the normal-state time-series data can be fully used for training. The first prediction model is generated as a model that outputs time-series data having the same time length as the predetermined time length in response to the input of input division data having the predetermined time length.

As shown in FIG. 3, after steps SA4 and SA6 are performed, the recording unit 215 records an upper limit value, a lower limit value and a statistic of each of N input difference data (step SA7). The upper limit value, the lower limit value and the statistic are recorded for each process amount. The upper limit value, the lower limit value, and the statistic are stored in the storage device 12 of the abnormality determination apparatus 1 in association with a process amount. The upper limit value, the lower limit value, and the statistic are used by the second inference unit 115 for clipping the input difference data. The statistic does not necessarily have to be recorded.

After step SA7 is performed, the second training unit 216 trains a single second prediction model, based on N input difference data (step SA8). The second prediction model trains parameters such that output difference data in which N normal-state input difference data are restored are output in response to the input of N input difference data. Since the second prediction model is a dimension reduction/restoration model, normal-state difference data can be restored from the feature amount of the normal-state difference data by training. The output difference data is data in which the main components included in the input difference data are restored. That is, the output difference data is data relating to the main components of slight fluctuations included in input time-series data. The trained second prediction model is stored in the storage device 12 of the abnormality determination apparatus 1.

Figure 15:
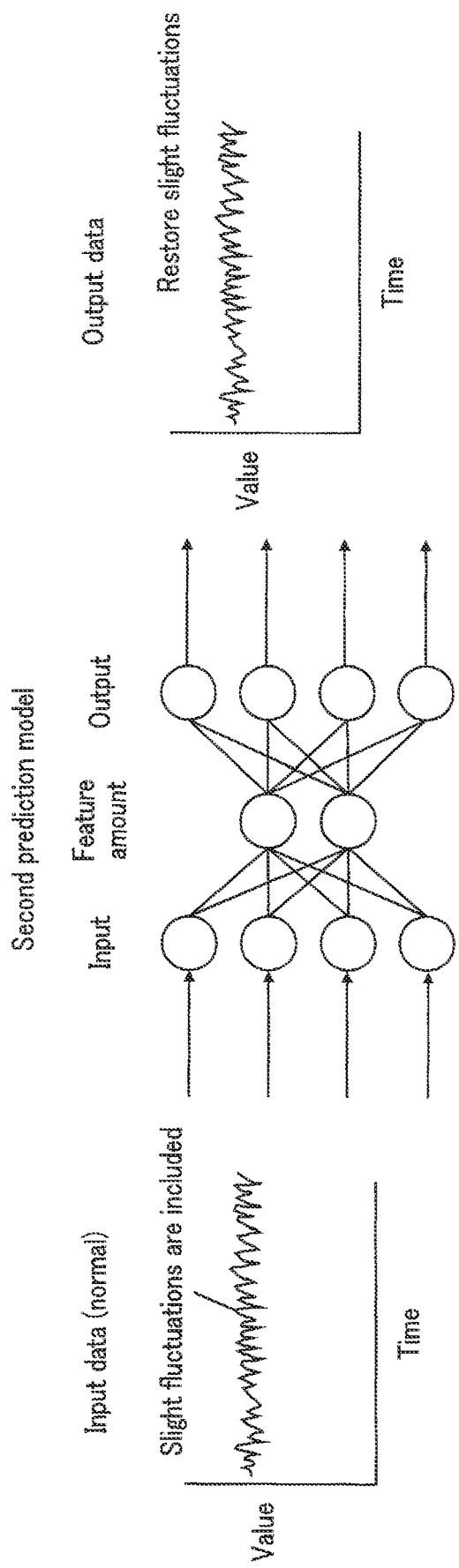
FIG. 15 is a diagram showing the output data obtained by inputting input difference data at a normal-state into a second prediction model.

FIGS. 15 and 16 are diagrams showing how inputs and outputs of the second prediction model are. FIG. 15 is a diagram showing how output data (output difference data) are when normal-state input data (input difference data) are input to the second prediction model. FIG. 16 is a diagram showing how output data (output difference data) are when abnormal-state input data (input difference data) are input to the second prediction model. With respect to slight fluctuations contained in data, a single predictive model often performs erroneous learning. For example, as shown in FIGS. 15 and 16, the second prediction model produces an identity mapping response that outputs the input as it is as an output for slight fluctuations, and as a result, even if abnormal data is input, it is restored as it is.

In machine learning, data should be preferably decomposed according to characteristics and the resultant data pieces should be trained separately, so that the training can be performed accurately and the features can be extracted accurately. The autoencoder can set the number of features as a model parameter, and by reducing the number of features, slight fluctuations that deviate from the main variations of input data are not restored. By performing a parameter survey with the number of features as a parameter and setting the number of features appropriately, a response that restores only waveform data can be made even where slight fluctuations are superimposed on the waveform data. The same applies to the other dimension reduction/restoration models.

Figure 17:
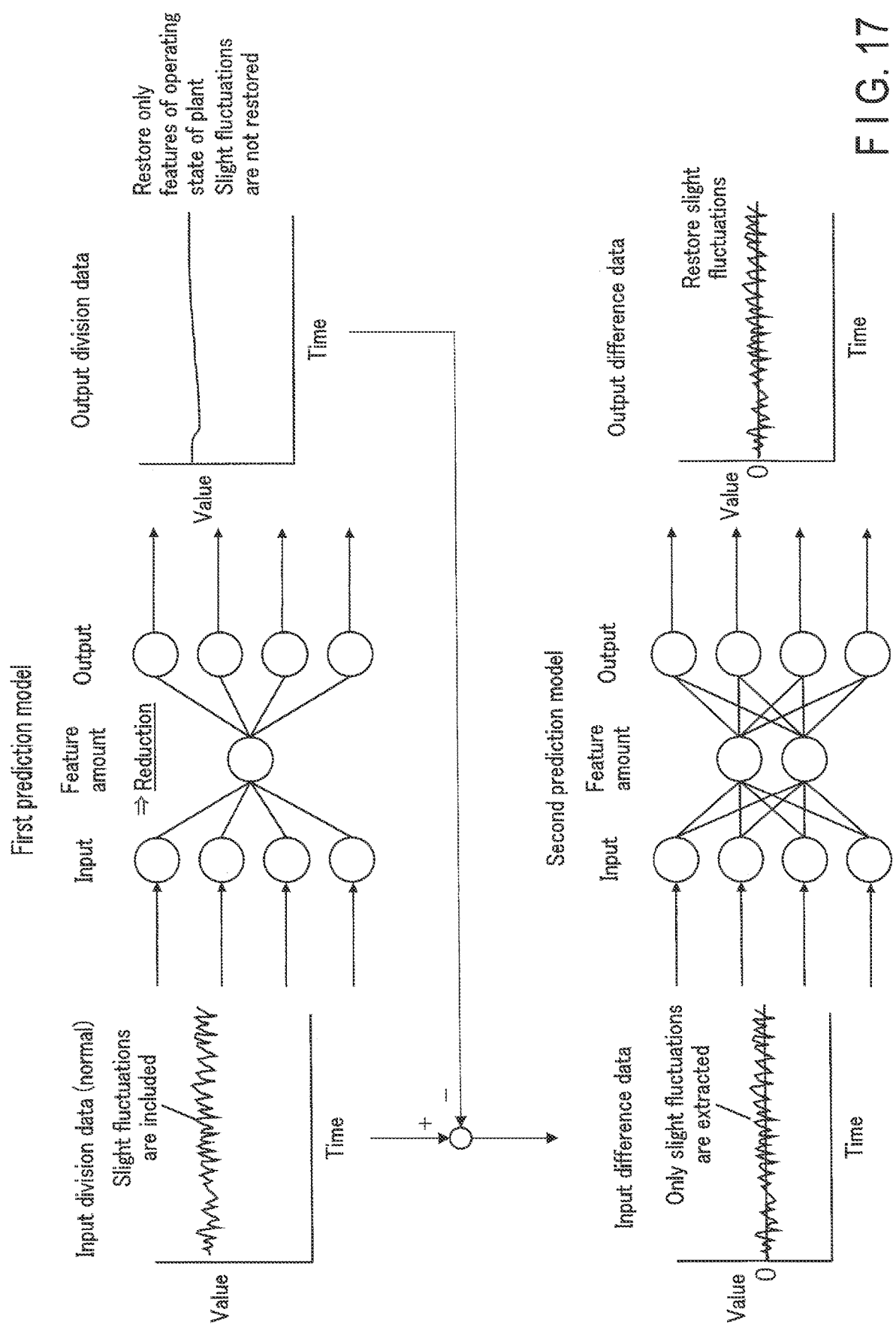
FIG. 17 is a diagram showing an example of input/output of a first prediction model and a second prediction model.

FIG. 17 is a diagram showing how inputs and outputs of the first prediction model are and how inputs and outputs of the second prediction model are. As shown in FIG. 17, the first prediction model receives input division data and produces output division data. Slight fluctuations are superimposed on the input division data. The first prediction model restores the main components contained in the input division data and does not restore the slight fluctuations. The second prediction model receives difference data (input difference data) between the input division data and the output division data, and produces output difference data. The input difference data includes slight fluctuations extracted from the input division data. The second prediction model restores the main components of the input difference data. That is, the second prediction model restores the slight fluctuations contained in the input difference data.

As shown in FIG. 17, the first training unit 213 performs training, with the number of features of the first prediction model being reduced, so that the first prediction model is a model that trains and restores only the features of the operating condition of the plant from the normal-state input division data and that does not restore the slight fluctuations. The slight fluctuations are separated and extracted as the difference between the input division data and normal-state output division data. The difference is trained by the second training unit 216 as slight fluctuation signals. In the second prediction model, only the correlation of the slight fluctuation signals of the sensors is trained. Thus, the second prediction model is generated as a model that correctly restores normal-state slight fluctuation signals.

Next, a description will be given of the reason why the second prediction model is used as a single model.

Figure 18:
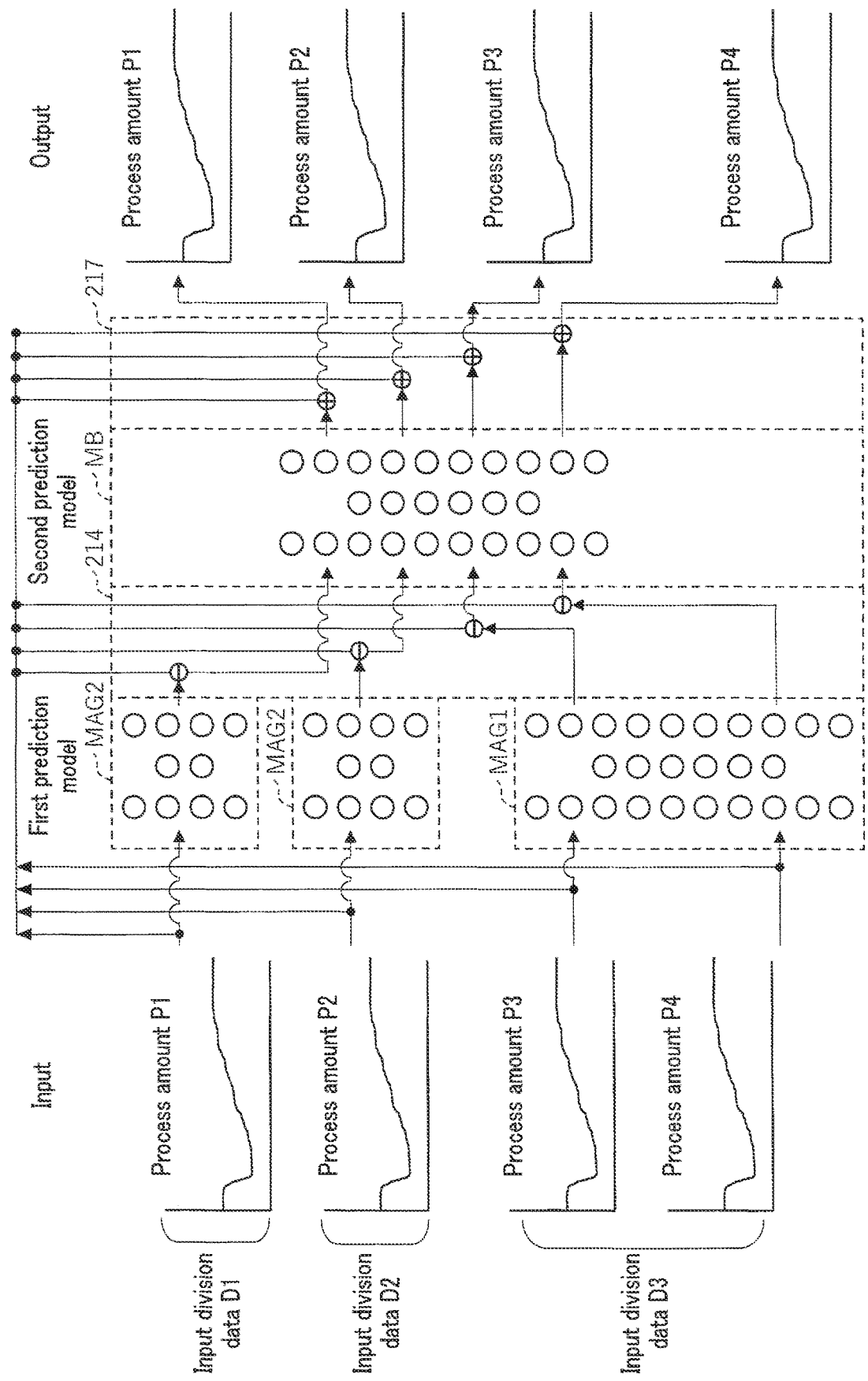
FIG. 18 is a diagram showing an example of input/output of a plurality of first prediction models and a single second prediction model.

FIG. 18 is a diagram showing how inputs and outputs of a plurality of first prediction models MAG1 and MAG2 are and how inputs and outputs of a single second prediction model MB are. As shown in FIG. 18, the first prediction model MAG includes a single first prediction model MAG1 corresponding to a single first group and a plurality of first prediction models MAG2 respectively corresponding to a plurality of second groups. For example, input time-series data on the process amount P1 belonging to the second group are input to the first prediction model MAG2, and the input time-series data on the process amount P2 are input to the first prediction model MAG2. Two input time-series data on the process amounts P3 and P4 belonging to the first group are input to the single first prediction model MAG1. The subtraction unit 214 generates input difference data, which is the difference between output time-series data and the input time-series data of the first prediction model MAG, for each of the process amounts. Input difference data on all process amounts are input to the single second prediction model MB. Output difference data on all process amounts are output from the second prediction model MB. The addition unit 217 generates restoration data, which is obtained by adding the output difference data and the input time-series data on each process amount. The first prediction model MAG is prepared for each group, in other words, for each input division data. On the other hand, with respect to the slight fluctuations dealt with by the second prediction model MB, it can be estimated that they are caused by external disturbance, slight fluctuations in the operating condition, noise, etc. However, it cannot be definitely said what causes the slight fluctuations, the division cannot be performed based on the knowledge of the plant or the design information. Therefore, the second prediction model MB is used as a single model.

Next, a description will be given of a learning method of the second training unit 216.

FIG. 19 is a diagram showing an example of training data of the second prediction model. Where the second training unit 216 trains slight fluctuation signals, the slight fluctuation signals cause aliasing because they contain a signal having a frequency higher than the sampling frequency of the time-series data of the plant, the frequency information (waveform information) on the slight fluctuation signals is lost in the time-series data, and the occurrence timing of the slight fluctuations is random in time. Therefore, where the second training unit 216 trains the slight fluctuation signals, the data to be trained should not include a time correlation of the slight fluctuation signals. If the time-series data are used for training, there is a possibility that uncorrelated data will be mistakenly regarded as correlated data, and erroneous training may be performed. Therefore, an instantaneous value at time t is used instead of the time-series data. By training the correlation between plant data only at the same time, the normal state can be restored accurately.

As shown in FIG. 19, the second training unit 216 extracts a difference between a value at the target time t of the training data (input time-series data) within a time window and a value at the target time t of the output time-series data of the first prediction model. The second training unit 216 extracts differences while sliding the target time t along the time axis direction within the time window. The second prediction model is trained using the extracted differences as training data. The second training unit 216 performs the above difference extraction process while sliding the time window along the time axis direction at predetermined intervals. The extraction of the differences is performed for the entire process amount (time-series data). According to the above method, the second prediction model is generated as a model that outputs a prediction value of the difference at a target time t in response to the input of the difference at the target time t. By sliding the time window along the time axis direction to generate training data, normal-state time-series data can be fully used for training. If the complex and long-time calculation process should be avoided due to the trade-off relationship between the model performance and the calculation cost, the target time t may be fixed without being slid.

After step SA8 is performed, the addition unit 217 generates N restoration data, based on the N output difference data generated in step SA8 and the output time-series data generated in steps SA3 and SA5 (step SA9).

FIG. 20 is a diagram schematically showing how a processing process is from the input of input division data to the first prediction model to the generation of restoration data. As shown in FIG. 20, the input division data (input time-series data) are input to the first prediction model, and output division data (output time-series data) are output. The first prediction model restores the main components of the input time-series data. Difference data (input difference data) between the input division data (input time-series data) and the output division data (output time-series data) is generated. The input difference data is data obtained by extracting slight fluctuations from the input division data. The input difference data is input to the second prediction model, and output difference data is output. The second prediction model restores the main components of the input difference data, in other words, slight fluctuations in the input division data. Restoration data is generated by adding the output division data and the output difference data. The restoration data is data in which the main components of the input difference data and the main components of the input division data (input time-series data) are combined. That is, the restoration data is data in which the main components and slight fluctuations of the input division data (input time-series data) are restored. In this manner, the addition unit 217 sums the output of the first prediction model and the output of the second prediction model, and normal-state restoration data in which slight fluctuations are superimposed on the plant operation state can be restored with high accuracy.

Figure 21:
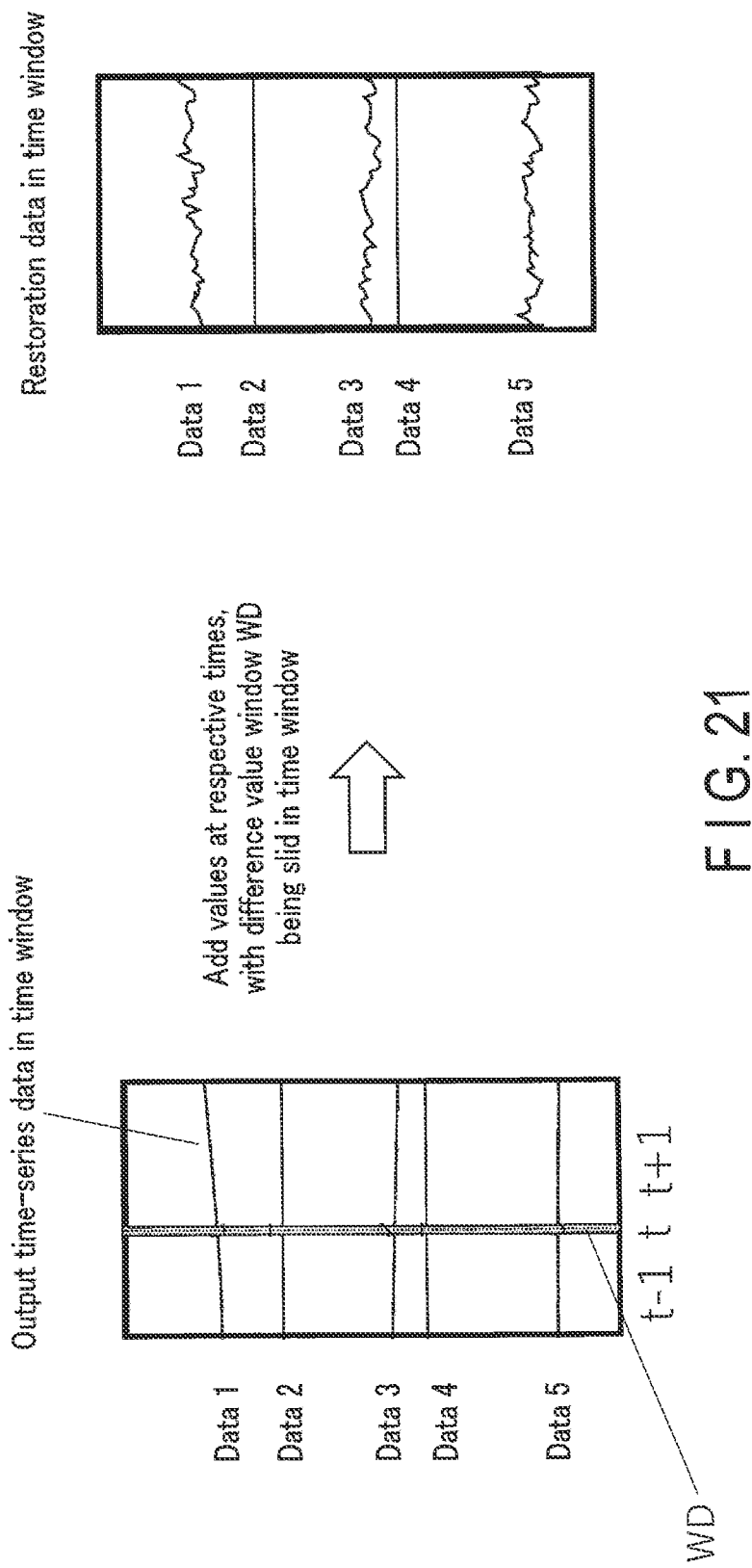
FIG. 21 is a diagram schematically showing an addition process performed by an addition unit.

FIG. 21 is a diagram schematically showing an addition process performed by the addition unit 217. As described above, the output of the first prediction model is time-series restoration data of a predetermined time length, while the output of the second prediction model is a prediction value of the difference between instantaneous values at a point of time, and the time-series data (t, t−1, t−2, . . . ) and the data on instantaneous values (t) are different in data dimensions. As shown in FIG. 21, in order to sum the data of different dimensions, the addition unit 217 slides a difference value window WD within the time window and calculates an added value (restoration data) of the output value which the output time-series data has at each target time t and the output value which the output difference data has at the target time t. The time window contains a plurality of output time-series data which the first prediction model outputs regarding a plurality of process amounts. Further, the difference value window WD contains a plurality of difference values which the second prediction model outputs at the target time t regarding the plurality of process amounts. By synchronously adding the plurality of difference values in the difference value window WD and the plurality of output time-series data at the target time t, restoration data regarding the plurality of process amounts can be generated.

After step SA9 is performed, the monitoring standard creation unit 218 generates N monitoring standards, based on N input time-series data and N restoration data (step SA10). More specifically, the monitoring standard creation unit 218 creates a monitoring standard for each of the N process amounts, based on the difference between the input time-series data and the restoration data. The monitoring standard is determined, based on the standard deviation of a difference, a confidence interval, etc. The monitoring standard is stored in the storage device 12 of the abnormality determination apparatus 1.

In the manner described above, a series of processes performed by the learning apparatus 2 are completed.

The series of processes performed by the learning apparatus 2 and shown in FIG. 3 is an example, and the processes are not limited to these. For example, the input difference data used for the training data of the second prediction model were described as being generated by the first prediction model, but they may be generated by another computer. In this case, the second prediction model may be trained before the first prediction model. Further, although the number of groups G1 was described as one, the present embodiment is not limited to this example, and a plurality of groups G1 may be provided. For example, the classification unit 212 sets a process amount of interest a plurality of times, and one group G1 is provided for each process amount of interest.

As described above, the learning apparatus 2 according to the present embodiment includes a classification unit 212, a first training unit 213 and a second training unit 216. The classification unit 212 classifies a plurality of input time-series data corresponding to a plurality of process amounts which a target facility generates at a normal-state into a plurality of groups. The first training unit 213 trains a plurality of first dimension reduction/restoration models corresponding to the plurality of groups, respectively. The first training unit 213 trains the plurality of first dimension reduction/restoration models, based on normal input time-series data on the corresponding process amounts, such that input time-series data on the process amounts are input and output time-series data on the restored input time-series data are output. The second training unit 216 trains a second dimension reduction/restoration model, based on normal input difference data, such that a plurality of input difference data which are based on a plurality of output time-series data and a plurality of input time-series data relating to a plurality of process amounts are input and a plurality of output difference data in which the plurality of input difference data are restored are output.

According to the above configuration, a first dimension reduction/restoration model can be generated for each group. Accordingly, training of spurious correlations can be prevented, and prediction values of physically unrelated process amounts are prevented from fluctuating. In addition, two-stage models consisting of a first dimension reduction/restoration model that is used for each group and a single second dimension reduction/restoration model that does not depend on any group are generated, so that main components and slight fluctuations of input time-series data can be restored with high accuracy. Thus, an abnormality or a sign of abnormality of the target facility can be determined or detected accurately.

Figure 22:
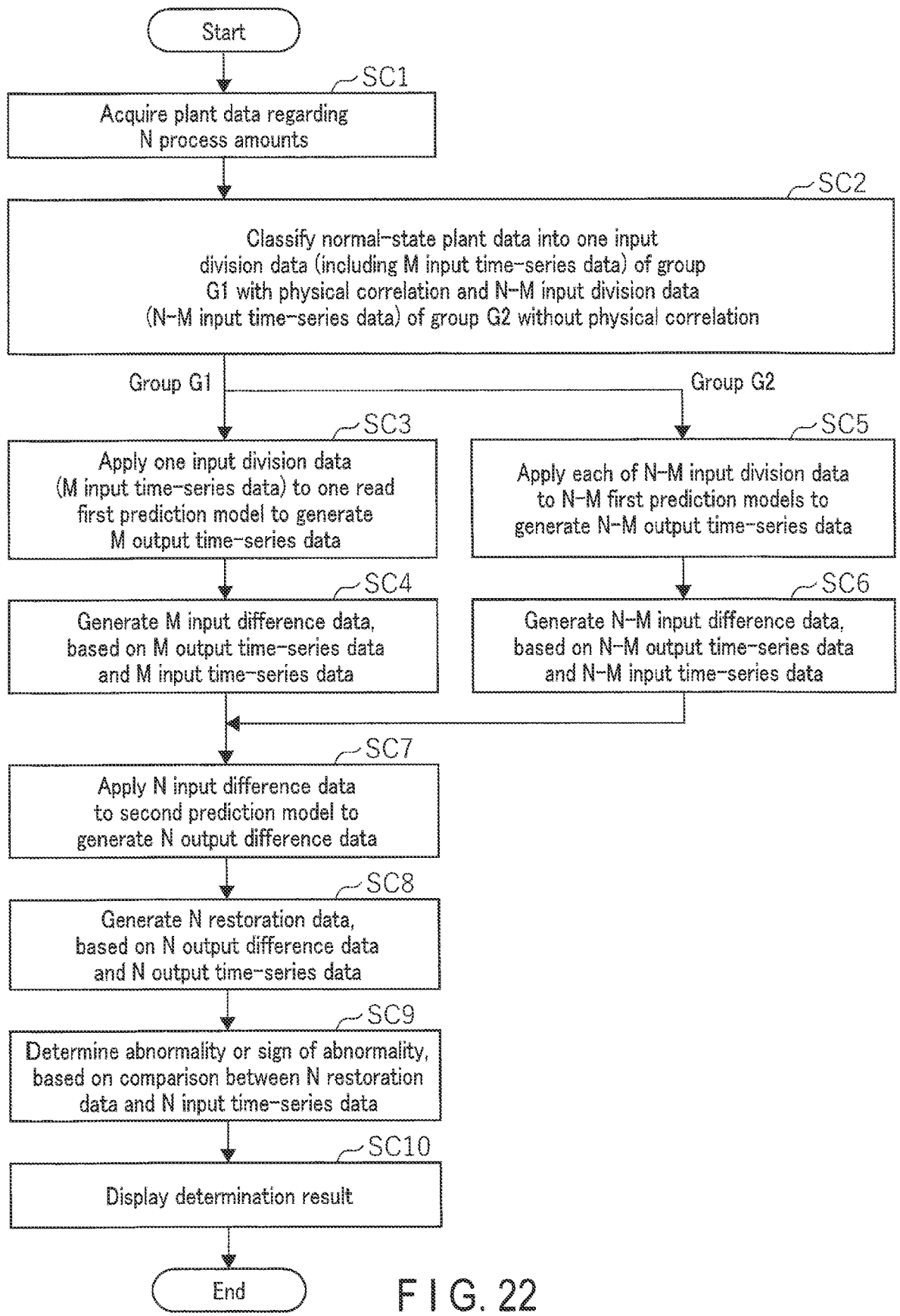
FIG. 22 is a flowchart showing a series of processes performed by the abnormality determination apparatus.

Next, an operation example of the abnormality determination apparatus 1 will be described with reference to FIG. 22. FIG. 22 is a flowchart showing a series of processes performed by the abnormality determination apparatus 1.

As shown in FIG. 22, the acquisition unit 111 acquires plant data relating to N process amounts (step SC1). The plant data includes N time-series data corresponding to respective N process amounts. At the start of step SC1, the N time-series data relating to the N process amounts and transmitted from a large-scale plant or the like are stored in the storage device 12. Therefore, in step SC1, the acquisition unit 111 extracts N time-series data on a determination target period in which an abnormality or a sign of abnormality is to be determined, from among the N time-series data stored in the storage device 12. The storage device 12 may store the N time-series data on the determination target period in which the abnormality or the sign of abnormality is to be determined. The processing described below is performed for each of N time-series data in the time window having a predetermined time length in the determination target period.

After step SC1 is performed, the classification unit 112 classifies the plant data acquired in step SC1 into one input division data of the group G1 with physical correlation and N−M input division data of the group G2 without physical correlation (step SC2). Specifically, in step SC2, the classification unit 112 classifies time-series data on each process amount included in the plant data into the group G1 or the group G2 with reference to the group recording table. M time-series data classified as the group G1 are used as one input division data, and N−M time-series data classified as the group G2 are used as N−M input division data. It should be noted that the classification unit 112 may execute the classification process shown in FIG. 4 in the same manner as the classification unit 212 of the learning apparatus 2, to thereby obtain one input division data on the group G1 and N−M input division data on the group G2.

After step SC2 is performed, the first inference unit 113 reads the first prediction model associated with the group G1 from the storage device 12. Then, the first inference unit 113 applies one input division data relating to the group G1 to one read first prediction model to generate M output time-series data (step SC3). After step SC3 is performed, the subtraction unit 114 generates one input difference data, based on the M output time-series data and M input time-series data (step SC4). The processing which the subtraction unit 114 performs in step SC4 is substantially similar to the processing which the subtraction unit 214 performs in step SA4.

After step SC2 is performed, the first inference unit 113 applies N−M input division data (input time-series data) to each of N−M first prediction models for the group G2, and N−M output time-series data are generated thereby (step SC5). In step SC5, the first inference unit 113 first reads a first prediction model associated with the process amount of the input time-series data from the storage device 12, for each of the N−M input time-series data, and then generates output time-series data by applying the input time-series data to the read first prediction model. After step SC5 is performed, the subtraction unit 114 generates N−M input difference data, based on the N−M output time-series data and the N−M input time-series data (step SC6). The processing which the subtraction unit 114 performs in step SC6 is substantially similar to the processing which the subtraction unit 214 performs in step SA6.

The steps SC3 and SC4 and the steps SC5 and SC6 may be performed in parallel or in series. Further, the steps SC3 and SC5 may be first performed in parallel or in series, and then the steps SC4 and SC6 may be performed in parallel or in series.

After step SC6 is performed, the second inference unit 115 applies N input difference data to a single second prediction model to generate N output difference data (step SC7). The second prediction model is a model trained based on the time-series data on the normal-state process amount within the range between an upper limit value and a lower limit value, and if data outside this range is input, correct prediction cannot be made. Correct prediction cannot be made for other process amounts as well, due to the correlation between the process amounts trained by the second prediction model, and false detection may be caused in a plurality of process amounts. Since outliers indicate operations that are normal but different from an ordinary operation, they are due to changes made in the process amounts not trained in the first prediction model, for example, due to one-off adjustment work of devices during the operation of the plant. Therefore, the second inference unit 115 clips the input difference data, using the upper limit value and the lower limit value recorded by the recording unit 215.

Figure 23:
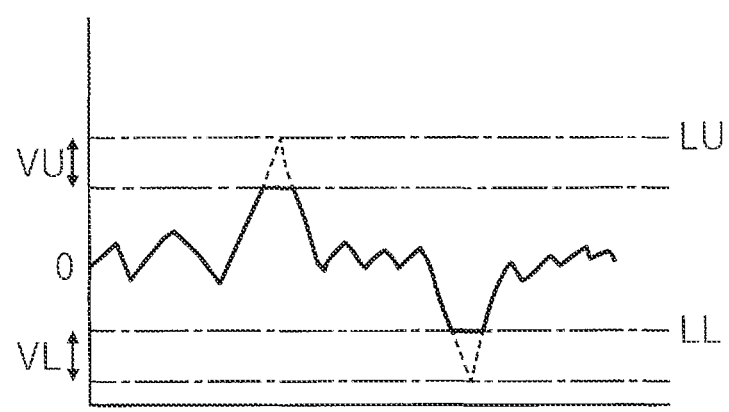
FIG. 23 is a diagram schematically showing a clipping process performed by a second inference unit.

Specifically, the second inference unit 115 determines whether or not each of the N input difference data includes outliers deviating from the range between the upper limit value and the lower limit value of the corresponding process amount of the input difference data recorded by the recording unit 215. Where the second inference unit 115 determines that there are no outliers, the second inference unit 115 applies the input difference data to the second prediction model. On the other hand, as shown in FIG. 23, where the second inference unit 115 determines that an outlier VU and/or an outlier VL are present, the second inference unit 115 replaces a portion VU larger than the upper limit value LU with the upper limit value LU and replaces a portion VL smaller than the lower limit value LL with the lower limit value LL. Difference data obtained after the replacement is applied to the second prediction model. Accordingly, false detection of an abnormality or a sign of abnormality which may be caused by outliers can be prevented or reduced. Where a statistic is recorded by the recording unit 215, the upper limit value LU and the lower limit value LL may be corrected based on the statistic, and the above clipping is performed based on the corrected upper limit value LU and the corrected lower limit value LL.

After step SC7 is performed, the addition unit 116 generates N restoration data, based on the N output difference data generated in step SC7 and the output time-series data generated in steps SC3 and SC5 (step SC8). More specifically, in step SC8, the addition unit 116 sums the output time-series data on the process amount within the time window of the predetermined period in the determination target period and the output difference data obtained by the second prediction model, and outputs restoration data of the time-series data on the process amount within the time window of the predetermined period. If the restoration data has similar characteristics to those of the training data, that is, if the restoration data is data having similar characteristics to normal-state data, the input data, i.e., the time-series data on the process amount within the time window of the determination target period, is restored. If the restoration data does not have such similar characteristics, that is, in the case of abnormal data, the input data is not restored. The processing which the addition unit 116 performs in step SC8 is similar to the processing which the addition unit performs in step SA9.

When step SC8 is performed, the determination unit 117 determines an abnormality or a sign of abnormality, based on the comparison between the N restoration data generated in step SC8 and the N input time-series data acquired in step SC1 (step SC9). In step SC9, the determination unit 117 calculates an error (difference) between the restoration data and the input time-series data, for each of the N process amounts. The error is generated for each point of time in the determination target period. Time-series data on the error is generated as error data. Then, the determination unit 117 determines whether or not the error satisfies the monitoring standard. The monitoring standard is defined as threshold values of an error.

Figure 24:
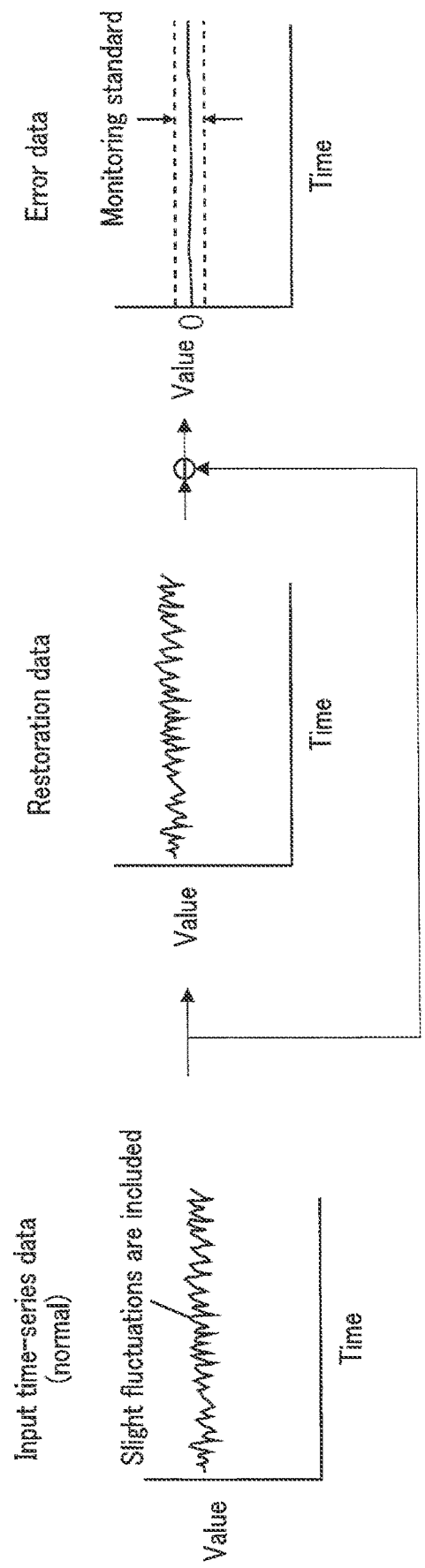
FIG. 24 is a diagram schematically showing a determination process (the absence of an abnormality or a sign of abnormality) performed by a determination unit.

FIGS. 24 and 25 are diagrams schematically showing the determination process performed by the determination unit 117. Referring to FIGS. 24 and 25, where the error between the input time-series data and the restoration data in the time window of the determination target period falls within the monitoring standard, as shown in FIG. 24, the determination unit 117 determines that there is no abnormality or no sign of abnormality in the large-scale power plant. Falling within the monitoring standard means that the error is within the range between the upper and lower threshold values that define the monitoring standard. As shown in FIG. 25, where the error between the time-series data on the process amount in the predetermined period of the determination target period and the restoration data in the predetermined period fails to fall within the monitoring standard, the determination unit 117 determines that there is an abnormality or a sign of abnormality in the large-scale power plant. Failing to fall within the monitoring standard means that the error is not within the range between the upper and lower threshold values that define the monitoring standard, in other words, the error is above the upper threshold value or below the lower threshold value. Thus, an abnormality or a sign of abnormality can be detected. The error may be calculated as an absolute value of the difference between the restoration data and the input time-series data. In this case, the monitoring standard can be defined by a single threshold value.

After step SC9 is performed, the display control unit 118 causes the display device 15 to display the determination result of step SC9, i.e., the determination result indicating the presence/absence of an abnormality or a sign of abnormality (step SC10). In step SC10, the display control unit 118 may display not only the determination result but also time-series data, restoration data, error data and monitoring standard of the process amount for which an abnormality or a sign of abnormality is determined.

In the manner described above, a series of processes performed by the abnormality determination apparatus 1 are completed.

The processing flow shown in FIG. 22 is an example, and various modifications can be made. For example, in the above description, the number of groups G1 was described as one, but the present embodiment is not limited to this, and there may be a plurality of groups G1.

As described above, the abnormality determination apparatus 1 according to the present embodiment includes a classification unit 112, a first inference unit 113, a second inference unit 115 and a determination unit 117. The classification unit 112 classifies a plurality of input time-series data corresponding to a plurality of process amounts generated in a target facility into a plurality of groups. For each of the plurality of groups, the first inference unit 113 applies one or more input time-series data included in the group to a first-dimension reduction/restoration model, which differs depending upon each group, and outputs one or more time-series data. The second inference unit 115 applies a plurality of input difference data, which are based on a plurality of output time-series data and a plurality of input time-series data on a plurality of process amounts, to a single second-dimension reduction/restoration model, and produces a plurality of output difference data. The determination unit 117 determines an abnormality or a sign of abnormality of the target facility, based on the comparison between a plurality of addition data which are based on a plurality of output difference data and a plurality of output time-series data, and a plurality of input time-series data.

According to the above configuration, a plurality of input time-series data on a plurality of process amounts are classified into a plurality of groups, and a plurality of independent first-dimension reduction/restoration models are applied to the plurality of groups, so that a fluctuation of the output time-series data, which may occur due to a spurious correlation of physically unrelated process amounts, can be prevented or reduced. Further, since both the first-dimension reduction/restoration model and the second-dimension reduction/restoration model are used, even a slight fluctuation of the input time-series data on the process amounts at a normal-state can be restored with high accuracy. Since an abnormality or a sign of abnormality is determined using such highly accurate restoration data, a determination can be made with high accuracy.

In the above embodiment, the abnormality determination apparatus 1 and the learning apparatus 2 were described as separate devices, but the present embodiment is not limited to this. That is, the abnormality determination apparatus 1 and the learning apparatus 2 may be realized by the same device.

As described above, according to the present embodiment, an abnormality or a sign of abnormality can be determined with high accuracy.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An abnormality determination apparatus comprising:
processing circuitry which is configured to realize:
an acquisition unit that acquires, via a network, a plurality of input time-series data from at least one of sensors, plant systems or other devices in a target facility, the plurality of input time-series data being output from the target facility and corresponding to a plurality of process amounts generated in the target facility, wherein the plurality of process amounts comprise at least one of physical measurement values output from the sensors used in the target facility, setting values of the plant systems or the other devices, or output values of the plant systems or the other devices;
a classification unit that classifies the plurality of input time-series data corresponding to the plurality of process amounts generated in the target facility into a plurality of groups, such that each group includes, from among the plurality of input time-series data, input time-series data corresponding to process amounts which are physically correlated and which originate from physically correlated subsystems or devices in the target facility, wherein, from among the plurality of input time-series data, input time-series data corresponding to process amounts which are not physically correlated are classified into different groups, and wherein physical correlation of the process amounts is determined based on a correlation coefficient threshold between the input time-series data corresponding to the respective process amounts;
a first inference unit that applies one or more input time-series data included in each of the groups to corresponding trained first neural network dimension reduction/restoration models which differ per group and are trained on training data including normal-state input time-series data corresponding to the process amounts of the corresponding group, and that outputs one or more output time-series data, wherein each of the trained first neural network dimension reduction/restoration models restores main trend components of corresponding input time-series data excluding a fluctuation signal component of the corresponding input time-series data, the restored main trend components being constituted by the output time-series data;
a subtraction unit that generates, for each of the groups, a plurality of input difference data between the plurality of input time-series data and the plurality of output time-series data output from the trained first neural network dimension reduction/restoration models, the plurality of input difference data including fluctuation signal components other than the main trend components of the input time-series data of the corresponding group;
a second inference unit that applies the plurality of input difference data to a single trained second neural network dimension reduction/restoration model, and that produces a plurality of output difference data, wherein the single trained second neural network dimension reduction/restoration model is trained on training data including normal-state fluctuation signals and restores fluctuation signal components included in the input difference data, restored fluctuation signal components being constituted by the output difference data;
an addition unit that generates a plurality of addition data by combining the plurality of output difference data and the plurality of output time-series data; and
a determination unit that determines an abnormality or a sign of abnormality of the target facility, based on a comparison between the plurality of addition data and the plurality of input time-series data to evaluate a deviation between restored expected behavior and actual behavior of physical processes or operations indicated by the input time-series data to detect the abnormality or the sign of abnormality in real-world physical operation of the target facility; and
a display control unit that causes a display device to display a result of the determination by the determination unit indicating a presence or absence of the abnormality or the sign of abnormality.

2. The abnormality determination apparatus according to claim 1, wherein the classification unit classifies, from among the plurality of input time-series data, input time-series data on a first process amount and input time-series data on a second process amount, which are not physically correlated with each other, into different groups.

3. The abnormality determination apparatus according to claim 2, wherein
the plurality of groups are classified into a first group and a second group,
the first group includes a single group to which two or more input time-series data on two or more process amounts belong,
the second group includes two or more groups, and
each of the two or more groups is a group to which single input time-series data on a single process amount belongs.

4. The abnormality determination apparatus according to claim 3, wherein the classification unit
designates a process amount of interest from among the plurality of process amounts,
calculates a correlation coefficient between input time-series data of interest regarding the process amount of interest and other input time-series data regarding other process amounts, and
based on the correlation coefficient and the correlation coefficient threshold, classifies other input time-series data that physically correlate with the input time-series data of interest into the first group, and classifies other input time-series data that do not physically correlate with the input time-series data of interest into the second group.

5. The abnormality determination apparatus according to claim 1, further comprising:
a memory that stores an upper limit value and a lower limit value of normal difference data, for each of the plurality of process amounts,
wherein
the normal difference data is difference data between input time-series data at a normal-state and output time-series data which the trained first neural network dimension reduction/restoration model produces based on the input time-series data at the normal-state, and
for each of the plurality of input difference data, the second inference unit replaces a portion of the plurality of input difference data larger than the upper limit value with the upper limit value and replaces a portion of the input difference data smaller than the lower limit value with the lower limit value, and applies input difference data after replacement to the single trained second neural network dimension reduction/restoration model.

6. The abnormality determination apparatus according to claim 5, wherein the memory stores the upper limit value and the lower limit value included in the normal difference data.

7. The abnormality determination apparatus according to claim 1, wherein
the trained first neural network dimension reduction/restoration model and the single trained second neural network dimension reduction/restoration model are autoencoders.

8. The abnormality determination apparatus according to claim 1, wherein
the determination unit calculates error data between addition data and the input time-series data for each of the plurality of process amounts, determines that the target facility has no abnormality or no sign of abnormality where the error data falls within a monitoring standard, and determines that the target facility has an abnormality or a sign of abnormality where the error data fails to fall within the monitoring standard.

9. The abnormality determination apparatus according to claim 1, wherein the plurality of input time-series data are time-series data which are within a predetermined time length of a determination target period.

10. A learning apparatus comprising:
processing circuitry that is configured to realize:
an acquisition unit that acquires, via a network, a plurality of normal-state input time-series data from at least one of sensors, plant systems or other devices in a target facility, the plurality of normal-state input time-series data being output from the target facility and corresponding to a plurality of normal-state process amounts generated in the target facility, wherein the plurality of normal-state process amounts comprise at least one of measurement values output from the sensors used in the target facility, setting values of the plant systems or the other devices, or output values of the plant systems or the other devices,
a classification unit that classifies the plurality of normal-state input time-series data corresponding to the plurality of normal-state process amounts generated in the target facility into a plurality of groups such that each group includes, from among the plurality of normal-state input time-series data, normal-state input time-series data corresponding to normal-state process amounts which are physically correlated and which originate from physically correlated subsystems or devices in the target facility, wherein, from among the plurality of normal-state input time-series data, normal-state input time-series data corresponding to process amounts which are not physically correlated are classified into different groups, and wherein physical correlation of the normal-state process amounts is determined based on a correlation coefficient threshold between the normal-state input time-series data corresponding to respective normal-state process amounts;
a first training unit that trains, for each of the groups, a corresponding first neural network dimension reduction/restoration model, using, as training data, the plurality of normal-state input time-series data corresponding to the normal-state process amounts of the group, such that each trained first neural network dimension reduction/restoration model outputs a plurality of output time-series data representing restored normal-state main trend components of corresponding input time-series data, excluding fluctuation signal components of the corresponding input time-series data;
a subtraction unit that generates, for each of the groups, a plurality of normal-state input difference data by calculating a difference between the plurality of normal-state input time-series data and the plurality of output time-series data output from the trained first neural network dimension reduction/restoration model of a corresponding group, the plurality of input difference data including normal state fluctuation signal components other than main trend components of the input time-series data of the corresponding group;
a second training unit that trains a second neural network dimension reduction/restoration model, using the plurality of normal-state input difference data generated for each of the groups as training data, such that the second neural network dimension reduction/restoration model restores normal-state fluctuation signal components from a plurality of input difference data and outputs a plurality of output difference data, the restored normal-state fluctuation signal components being constituted by the plurality of output difference data;
and
an addition unit that generates a plurality of addition data by combining the plurality of output difference data and the plurality of output time-series data.

11. The learning apparatus according to claim 10, wherein the processing circuitry is further configured to realize:
a recording unit that records an upper limit value and a lower limit value of input difference data or output difference data, for each of the process amounts.

12. The learning apparatus according to claim 10, wherein the processing circuitry is further configured to realize:
a monitoring standard creation unit that creates a monitoring standard for determining an abnormality or a sign of abnormality of the target facility, based on input time-series data and the addition data, for each of the process amounts.

13. The learning apparatus according to claim 12, wherein the monitoring standard creation unit determines as the monitoring standard an upper limit value of an absolute value of difference data between the input time-series data and the plurality of addition data.

14. The learning apparatus according to claim 10, wherein the classification unit classifies, from among the plurality of normal-state input time-series data, input time-series data on a first process amount and input time-series data on a second process amount, which are not physically correlated with each other, into different groups.

15. The learning apparatus according to claim 14, wherein the plurality of groups are classified into a first group and a second group,
the first group includes a single group to which two or more input time-series data on two or more process amounts belong,
the second group includes two or more groups, and
each of the two or more groups is a group to which single input time-series data on a single process amount belongs.

16. The learning apparatus according to claim 15, wherein the classification unit
designates a process amount of interest from among the process amounts,
calculates a correlation coefficient between input time-series data of interest regarding the process amount of interest and other input time-series data regarding other process amounts, and based on the correlation coefficient and the correlation coefficient threshold, classifies other input time-series data that physically correlate with the input time-series data of interest into the first group, and classifies other input time-series data that do not physically correlate with the input time-series data of interest into the second group.

17. An abnormality determination method executed by processing circuitry, the method comprising:

acquiring, via a network, a plurality of input time-series data from at least one of sensors, plant systems or other devices in a target facility, the plurality of input time-series data being output from the target facility and corresponding to a plurality of process amounts generated in the target facility, wherein the process amounts comprise at least one of physical measurement values output from the sensors used in the target facility, setting values of the plant systems or the other devices, or output values of the plant systems or the other devices, classifying the plurality of input time-series data corresponding to the plurality of process amounts generated in the target facility into a plurality of groups such that each group includes, from among the plurality of input time-series data, input time-series data corresponding to process amounts which are physically correlated and which originate from physically correlated subsystems or devices in the target facility, wherein, from among the plurality of input time-series data, input time-series data corresponding to process amounts which are not physically correlated are classified into different groups, and wherein physical correlation of the process amounts is determined based on a correlation coefficient threshold between the input time-series data corresponding to the respective process amounts;

applying one or more input time-series data included in each of the groups to corresponding trained first neural network dimension reduction/restoration models which differ per group and are trained on training data including normal-state input time-series data corresponding to the process amounts of a corresponding group, thereby outputting one or more output time-series data, wherein each of the trained first neural network dimension reduction/restoration models restores main trend components of corresponding input time-series data excluding a fluctuation signal component of the corresponding input time-series data, the restored main trend components being constituted by the output time-series data;

generating, for each of the groups, a plurality of input difference data between the plurality of input time-series data and the output time-series data output from the trained first neural network dimension reduction/restoration models, the plurality of input difference data including fluctuation signal components other than the main trend components of the input time-series data of the corresponding group;

applying the plurality of input difference data to a single trained second neural network dimension reduction/restoration model, thereby outputting a plurality of output difference data, wherein the single trained second neural network dimension reduction/restoration model is trained on training data including normal-state fluctuation signals and restores fluctuation signal components included in the input difference data, restored fluctuation signal components being constituted by output difference data;

generating a plurality of addition data by combining the plurality of output difference data and the output time-series data; and determining an abnormality or a sign of abnormality of the target facility, based on a comparison between the plurality of addition data and the plurality of input time-series data to evaluate a deviation between restored expected behavior and actual behavior of physical processes or operations indicated by the input time-series data to detect the abnormality or the sign of abnormality in real-world physical operation of the target facility, and controlling a display device to display a determination result of the determining indicating presence or absence of the abnormality or the sign of abnormality.

* * * * *